US010212718B2

(12) United States Patent
Itagaki et al.

(10) Patent No.: US 10,212,718 B2
(45) Date of Patent: Feb. 19, 2019

(54) COMMUNICATION APPARATUS AND COMMUNICATION METHOD

(71) Applicant: SONY CORPORATION, Tokyo (JP)

(72) Inventors: Takeshi Itagaki, Saitama (JP); Tomoya Yamaura, Tokyo (JP); Yuichi Morioka, Weybridge The Uni (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/520,067

(22) PCT Filed: Aug. 3, 2015

(86) PCT No.: PCT/JP2015/071919
§ 371 (c)(1),
(2) Date: Apr. 18, 2017

(87) PCT Pub. No.: WO2016/067693
PCT Pub. Date: May 6, 2016

(65) Prior Publication Data
US 2017/0325247 A1    Nov. 9, 2017

(30) Foreign Application Priority Data
Oct. 28, 2014 (JP) .................................. 2014-219223

(51) Int. Cl.
*H04W 72/12*    (2009.01)
*H04J 1/00*    (2006.01)
(Continued)

(52) U.S. Cl.
CPC ............... *H04W 72/12* (2013.01); *H04J 1/00* (2013.01); *H04J 13/00* (2013.01); *H04L 5/0048* (2013.01);
(Continued)

(58) Field of Classification Search
CPC ............. H04W 72/12; H04W 72/1205; H04W 72/1242; H04W 72/1247; H04W 72/1278;
(Continued)

(56) References Cited

U.S. PATENT DOCUMENTS 6,721,303 B1 *   4/2004   Menzel ............. H04W 72/0446
                                                    370/337
7,948,991 B1 *   5/2011   Hart ..................... H04L 1/1854
                                                    370/395.4
(Continued)

FOREIGN PATENT DOCUMENTS

JP      2010-263490 A      11/2010
JP      2010-263493 A      11/2010
(Continued)

OTHER PUBLICATIONS

Abusubaih, et al., "Inter-AP Coordination Protocols (TKN Technical Report TKN-06-005)", http://www.tkn.tu-berlin.de/public.ations/papers/APCoordination.pdf, Jul. 2006, 45 pages.
(Continued)

*Primary Examiner* — Kevin D Mew
(74) *Attorney, Agent, or Firm* — Chip Law Group

(57) ABSTRACT

Provided is a communication apparatus that includes a communication unit configured to receive frames including first information from a plurality of other communication apparatuses and transmit first frames including information indicating a first transmission time period to the plurality of other communication apparatuses. The communication appratus further includes a control unit configured to determine the first transmission time period on the basis of the plurality of pieces of first information and a processing unit configured to generate the first frames.

22 Claims, 17 Drawing Sheets

(51) Int. Cl.
*H04J 13/00* (2011.01)
*H04W 16/28* (2009.01)
*H04W 74/08* (2009.01)
*H04W 84/12* (2009.01)
*H04L 5/00* (2006.01)
*H04W 52/34* (2009.01)

(52) U.S. Cl.
CPC ......... *H04W 16/28* (2013.01); *H04W 52/346* (2013.01); *H04W 74/08* (2013.01); *H04W 84/12* (2013.01)

(58) Field of Classification Search
CPC .......... H04W 72/1284; H04W 72/1289; H04L 5/0048; H04L 5/005; H04L 5/0051
See application file for complete search history.

(56) References Cited

U.S. PATENT DOCUMENTS

| | | | | |
|---|---|---|---|---|
| 8,942,201 B1* | 1/2015 | Duvvuri | ................ | H04W 56/00 370/329 |
| 2002/0093940 A1* | 7/2002 | Toskala | ................ | H04B 7/2668 370/350 |
| 2002/0150058 A1* | 10/2002 | Kim | ................ | H04B 7/2656 370/280 |
| 2002/0196766 A1* | 12/2002 | Hwang | ................ | H04W 52/44 370/342 |
| 2004/0105402 A1* | 6/2004 | Yi | ................ | H04B 7/2628 370/312 |
| 2005/0135295 A1* | 6/2005 | Walton | ................ | H04L 5/0048 370/328 |
| 2007/0159982 A1* | 7/2007 | Singh | ................ | H04W 74/04 370/252 |
| 2007/0201468 A1* | 8/2007 | Jokela | ................ | H04L 12/18 370/390 |
| 2010/0080323 A1* | 4/2010 | Mueck | ................ | H04J 11/0033 375/296 |
| 2010/0220654 A1 | 9/2010 | Wentink | | |
| 2010/0315989 A1* | 12/2010 | Reznik | ................ | H04B 7/15557 370/315 |
| 2011/0090855 A1 | 4/2011 | Kim | | |
| 2011/0268054 A1 | 11/2011 | Abraham et al. | | |
| 2012/0224534 A1* | 9/2012 | Kimura | ................ | H04W 28/06 370/328 |
| 2012/0236812 A1* | 9/2012 | Chen | ................ | H04L 1/1685 370/329 |
| 2014/0314004 A1 | 10/2014 | Zhou et al. | | |
| 2015/0092652 A1* | 4/2015 | Ramamurthy | ...... | H04W 72/005 370/312 |
| 2015/0359000 A1* | 12/2015 | Li | ................ | H04W 74/06 370/329 |
| 2016/0020885 A1* | 1/2016 | Li | ................ | H04L 1/1854 370/329 |
| 2017/0280421 A1* | 9/2017 | Ramamurthy | ...... | H04W 72/005 |

FOREIGN PATENT DOCUMENTS

| | | |
|---|---|---|
| JP | 2011-109205 A | 6/2011 |
| JP | 2013-005033 A | 1/2013 |
| JP | 2013-115582 A | 6/2013 |
| WO | 2010/099491 A2 | 9/2010 |

OTHER PUBLICATIONS

Extended European Search Report of EP Application No. 15853801.7, dated Oct. 9, 2017, 08 pages of EESR.
Search Report and Written Opinion of SG Application No. 11201703087W, dated May 2, 2018, 07 pages.

* cited by examiner

COMMUNICATION APPARATUS AND COMMUNICATION METHOD

CROSS REFERENCE TO RELATED APPLICATIONS

This application is a U.S. National Phase of International Patent Application No. PCT/JP2015/071919 filed on Aug. 3, 2015, which claims priority benefit of Japanese Patent Application No. JP 2014-219223 filed in the Japan Patent Office on Oct. 28, 2014. Each of the above-referenced applications is hereby incorporated herein by reference in its entirety.

TECHNICAL FIELD

The present disclosure relates to communication apparatuses and communication methods.

BACKGROUND ART

Wireless local area networks (LANs), typified by IEEE (Institute of Electrical and Electronics Engineers) 802.11, have in recent years been widespread, leading to an increase in the information amount of transmitted contents and the number of wireless LAN-capable products. Therefore, to improve the efficiency of communication over an entire network, the standard IEEE 802.11 is still being enhanced.

In the 802.11ac standard, which is an example enhanced version of the standard IEEE 802.11, multi-user multi-input multi-output (MU-MIMO) is employed for a downlink (DL). MU-MIMO is a technique for allowing transmission of a plurality of signals during the same period of time through space-division multiplexing. The technique can improve the efficiency of use of frequencies, for example.

However, different communication apparatuses may transmit frames during different transmission time periods. In this case, the number of multiplexed frames fluctuates during a period of time when the frames are received. Therefore, the reception power of a communication apparatus that receives multiplexed frames fluctuates during the reception time period. The fluctuation of the reception power may have an influence on the performance of reception. To address this problem, a technique of transmitting frames during equal transmission time periods has been proposed.

For example, Patent Literature 1 describes a communication apparatus that appropriately adds a padding to a plurality of frames having different transmission time periods and thereby transmits the plurality of frames during equal transmission time periods.

In addition, Patent Literature 2 describes a communication method in which a communication apparatus serving as an access point (AP) transmits uplink (UL) permission information designating a transmission time period of a UL frame and a communication apparatus receiving the UL permission information transmits a UL frame over the designated transmission time period.

CITATION LIST

Patent Literature

Patent Literature 1: JP 2010-263490A
Patent Literature 2: JP 2010-263493A

DISCLOSURE OF INVENTION

Technical Problem

However, according to the inventions disclosed in Patent Literatures 1 and 2, there are cases in which it is difficult to efficiently use wireless communication resources. For example, according to the invention disclosed in Patent Literature 1, wireless communication resources are consumed by a padding that is not relevant as data. In addition, according to the invention disclosed in Patent Literature 2, an AP does not know a transmission time period desired by each of communication apparatuses that transmit UL frames at a point in time at which a transmission time period of the UL frames is designated, and thus may designate a transmission time period longer than the desired transmission time period. For this reason, there is a probability that all of communication apparatuses which transmit UL frames will transmit paddings.

Therefore, the present disclosure proposes a new and improved communication apparatus and communication method that can reconcile efficient use of wireless communication resources with stabilization of reception performance in wireless multiplex communication.

Solution to Problem

According to the present disclosure, there is provided a communication apparatus including: a communication unit configured to receive frames including first information from a plurality of other communication apparatuses and transmit first frames including information indicating a first transmission time period to the plurality of other communication apparatuses; a control unit configured to determine the first transmission time period on the basis of the plurality of pieces of first information; and a processing unit configured to generate the first frames.

According to the present disclosure, there is provided a communication method including: receiving frames including first information from a plurality of other communication apparatuses, and transmitting first frames including information indicating a first transmission time period to the plurality of other communication apparatuses; determining the first transmission time period on the basis of the plurality of pieces of first information; and generating the first frames.

Advantageous Effects of Invention

As described above, according to the present disclosure, a communication apparatus and a communication method that can reconcile efficient use of wireless communication resources with stabilization of reception performance in wireless multiplex communication are provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
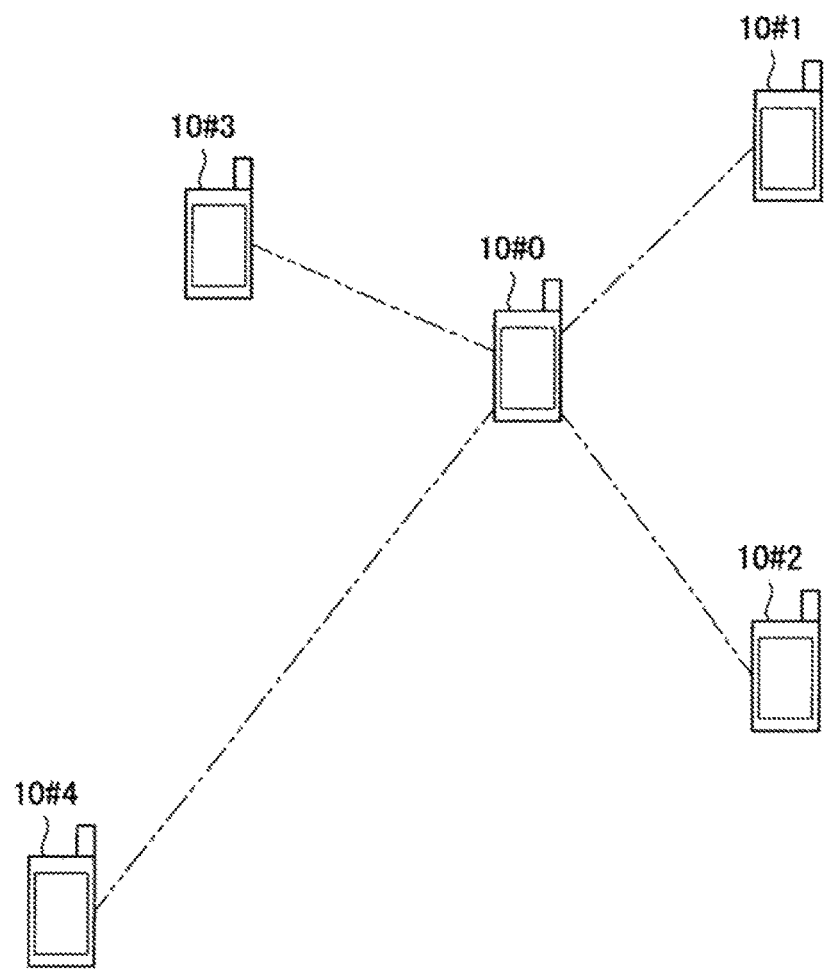
FIG. 1 is a diagram showing an example configuration of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, in the present specification and the drawings, different numbers are attached to the end of the same reference number to distinguish a plurality of components having substantially the same functional configuration from each other in some cases. For example, a plurality of components having substantially the same function are distinguished, such as communication stations 10#1 and 10#2, as necessary. However, when it is unnecessary to distinguish substantially the same functional configurations, only the same reference number is given thereto. For example, when it is not particularly necessary to distinguish the communication stations 10#1 and 10#2 from each other, they are simply referred to as communication stations 10.

In addition, the description will be made in the following order.

1. Overview of communication system according to embodiment of present disclosure
2. First embodiment (example of space-division multiplex communication)
3. Second embodiment (example of dividing UL frame)
4. Third embodiment (example of multicast communication)
5. Fourth embodiment (example of frequency-division multiplex communication)
6. Application example
7. Conclusion <1. Overview of Communication System According to Embodiment of Present Disclosure>

Firstly, an overview of a communication system according to an embodiment of the present disclosure will be described with reference to FIG. 1. FIG. 1 is a diagram showing an example configuration of the communication system of the embodiment of the present disclosure.

The communication system is configured with a plurality of communication apparatuses (hereinafter, also referred to as communication stations) 10. The communication stations 10 have a wireless communication function and perform communication using multiplexing. Also, the communication stations 10 operate as APs or terminals. Hereinafter, a communication station operating as an AP will also be referred to as a master station, and communication stations operating as terminals will be referred to as slave stations. For this reason, in the communication system, one-to-multiple communication using multiplexing is possible between the master station and the slave stations. Here, communication from the master station to the slave stations is referred to as downlink (DL), and communication from the slave stations to the master station is referred to as uplink (UL).

For example, as shown in FIG. 1, the communication system may include a plurality of communication stations 10#0 to 10#4. The communication station 10#0 which is a master station and the communication stations 10#1 to 10#4 which are slave stations are connected through wireless communication and directly transmit and receive frames to and from each other. For example, the master station 10#0 is a communication station conforming to IEEE802.11ac, and performs space-division multiple access (SDMA) using an adaptive array antenna.

Here, when transmission time periods of frames separately transmitted by a plurality of slave stations are different, the number of multiplexed frames generally fluctuates during a period of time in which the frames are received. For this reason, reception power of a master station that receives the frames drastically changes during the reception time period, and the change in the reception power may have an effect on reception performance of the master station.

To address this problem, a method in which a master station designates a transmission time period of a UL frame and slave stations make transmission time periods of UL frames the same as the designated transmission time period has been proposed. However, according to this method, the master station does not know a transmission time period desired by each of the slave stations that transmit UL frames at a point in time at which a transmission time period of the UL frames is designated, and thus may designate a transmission time period longer than the desired transmission time period. For this reason, there is a probability that all of the slave stations which transmit UL frames will transmit paddings. On the other hand, when a transmission time period shorter than the desired transmission time period is designated, a UL frame to be transmitted does not fit in the designated transmission time period, and there is also a probability that it will be difficult for a slave station to transmit the UL frame.

Therefore, the present disclosure proposes a communication apparatus and a communication method that can reconcile efficient use of wireless communication resources with stabilization of reception performance in wireless multiplex communication. Details thereof will be described below. Here, although an example of a communication system in which the communication station 10#0 is a master station is described in FIG. 1, another communication station 10 may be a master station, or the communication station 10#0 may be a communication station having a plurality of direct links with other communication stations 10#1 to 10#4. In the latter case, the aforementioned UL may be replaced with "simultaneous transmission from one station to a plurality of stations," and the aforementioned UL may be replaced with "simultaneous transmission from a plurality of stations to one station." Also, for convenience of description, communication stations 10 according to first to fourth embodiments are distinguished by attaching numbers corresponding to the embodiments to the ends thereof, such as a communication station 10-1 and a communication station 10-2.

<2. First Embodiment (Example of Space-division Multiplex Communication)>

A communication system according to an embodiment of the present disclosure has been described above. Next, communication stations 10-1 according to a first embodiment of the present disclosure are described. In the present embodiment, a master station among the communication stations 10-1 determines a permitted transmission time period of a UL frame on the basis of information indicating transmission time periods received from slave stations. Thereafter, the slave stations transmit UL frames on the basis of the permitted transmission time period.

<2-1. Configuration of Communication Apparatus>

Figure 2:
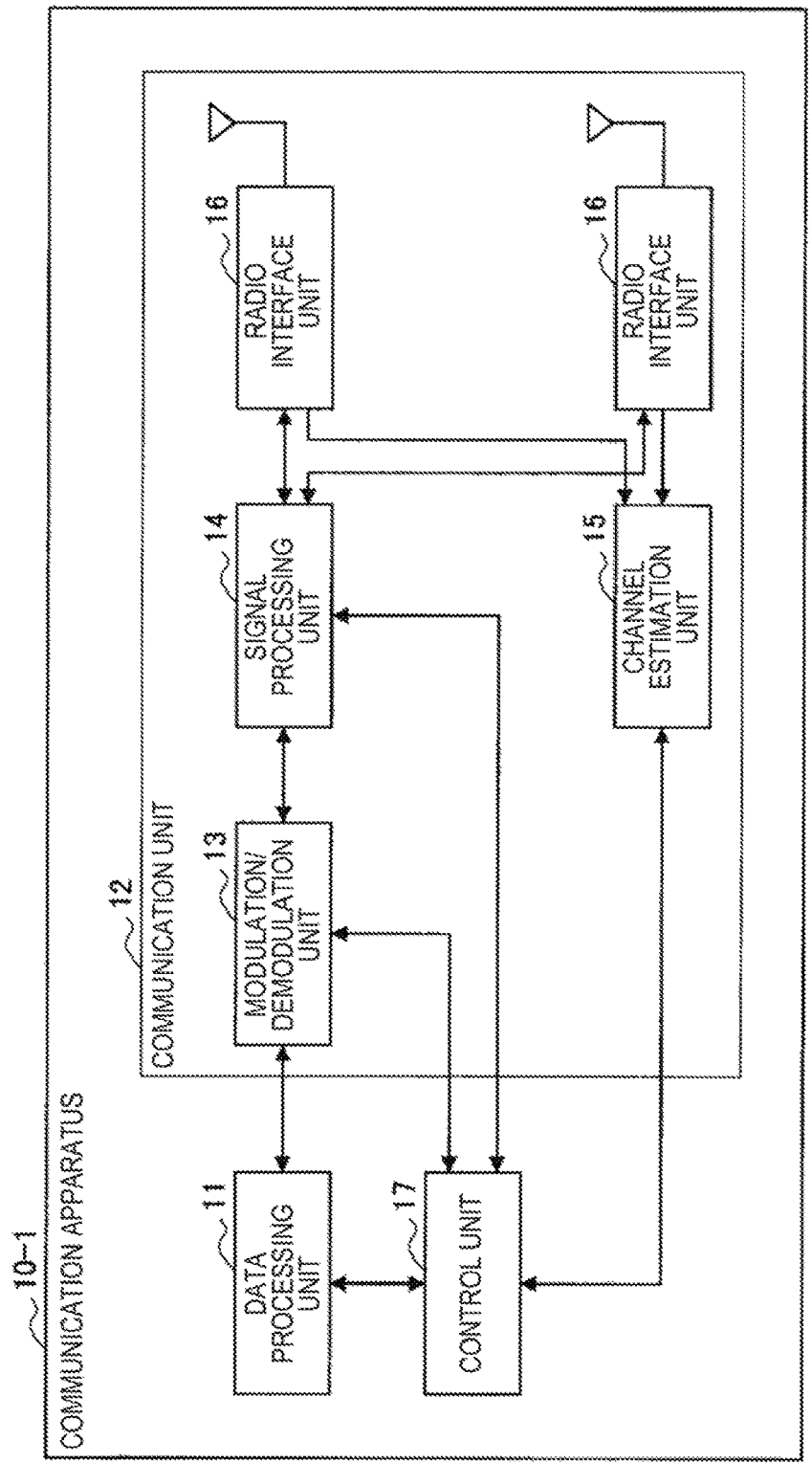
FIG. 2 is a block diagram showing a schematic functional configuration of a communication station according to a first embodiment of the present disclosure.

First, a configuration of a communication station 10-1 according to the first embodiment of the present disclosure will be described with reference to FIG. 2. FIG. 2 is a block diagram showing a schematic functional configuration of a communication station 10-1 according to the first embodiment of the present disclosure.

As shown in FIG. 2, the communication station 10-1 includes a data processing unit 11, a communication unit 12, and a control unit 17. First, basic functions of the communication station 10-1 will be described.

((Basic Functions))

The data processing unit 11 performs a process for transmission and reception of data. Specifically, the data processing unit 11 generates a frame on the basis of data from a higher-level layer of communication, and provides the generated frame to a modulation/demodulation unit 13 described below. For example, the data processing unit 11 generates a frame (or packets) from data, and performs processes, such as addition of a MAC header for media access control (MAC), addition of an error detection code, and the like, on the generated frame. The data processing unit 11 also extracts data from a received frame, and provides the extracted data to a higher-level layer of communication. For example, the data processing unit 11 obtains data by performing, on a received frame, analysis of a MAC header, detection and correction of code error, a reordering process, and the like As shown in FIG. 2, the communication unit 12 includes a modulation/demodulation unit 13, a signal processing unit 14, a channel estimation unit 15, and radio interface units 16.

The modulation/demodulation unit 13 performs a modulation process and the like on a frame. Specifically, the modulation/demodulation unit 13 performs encoding, interleaving, and modulation on a frame provided by the data processing unit 11, in accordance with coding and modulation schemes and the like set by the control unit 17, to generate a symbol stream. Thereafter, the modulation/demodulation unit 13 provides the generated symbol stream to the signal processing unit 14. The modulation/demodulation unit 13 also performs demodulation and decoding or the like on the symbol stream provided by the signal processing unit 14 to obtain a frame, and provides the obtained frame to the data processing unit 11 or the control unit 17.

The signal processing unit 14 performs a process involved in space-division multiplex communication. Specifically, the signal processing unit 14 performs a signal process involved in space separation, on a symbol stream provided by the modulation/demodulation unit 13, and provides symbol streams obtained by the process to the respective radio interface units 16. The signal processing unit 14 also performs a spatial process, such as a symbol stream separation process or the like, on symbol streams obtained from the radio interface units 16, and provides a symbol stream obtained by the process to the modulation/demodulation unit 13.

The channel estimation unit 15 estimates a channel gain. Specifically, the channel estimation unit 15 calculates complex channel gain information from a preamble part or training signal part of a signal contained in the symbol stream obtained from the radio interface unit 16. Note that the calculated complex channel gain information is provided to the modulation/demodulation unit 13 and the signal processing unit 14 through the control unit 17, and is used in a modulation process and a space separation process or the like.

The radio interface unit 16, which includes an antenna, transmits and receives a signal through the antenna. Specifically, the radio interface unit 16 converts a signal contained in a symbol stream provided from the signal processing unit 14, into an analog signal, and performs amplification, filtering, and frequency upconversion on the analog signal. Thereafter, the radio interface unit 16 transmits the processed signal through the antenna. The radio interface unit 16 also performs, on a signal from the antenna, reverse processes to those which are performed for signal transmission, such as frequency downconversion, digital signal conversion, and the like, and provides the signal obtained by the processes to the channel estimation unit 15 and the signal processing unit 14.

Here, a slave station may not include the signal processing unit 14, the channel estimation unit 15, and the two radio interface units 16. Also, the modulation/demodulation unit 13, the signal processing unit 14, the channel estimation unit 15, and the radio interface units 16 are collectively referred to as the communication unit 12.

The control unit 17 controls an overall operation of the communication station 10-1. Specifically, the control unit 17 transfers information between each function, sets communication parameters, and schedules frames (or packets) in the data processing unit 11, for example.

((Functions of Case of Operating as Master Station))

Next, functions of a case in which the communication station 10-1 operates as a master station will be described in detail.

(Functions Relating to Uplink Transmission Time Period Notification Process)

The data processing unit 11 generates a frame relating to prior communication for communication using space-division multiplexing. Specifically, the data processing unit 11 generates a frame which requests a slave station to transmit a frame including a reference signal for estimating an antenna weight used for space-division multiplexing. For example, the data processing unit 11 generates a training request (TRQ) frame.

Further, the data processing unit 11 includes information indicating a plurality of slave stations which are destinations of the TRQ frame. For example, the data processing unit 11 may include information indicating either of MAC addresses of the slave stations and a group identifier for grouping the slave stations in the TRQ frame. Here, the group identifier is considered to be known to the slave stations.

Also, the data processing unit 11 includes information for separating respective frames, for example, training feedback (TFB) frames, transmitted from the slave stations as responses to the TRQ frame. For example, the data processing unit 11 includes information designating an encoding method for orthogonalizing reference signals included in the TFB frames in the TRQ frame. Here, a method of separating TFB frames is not limited to the aforementioned method, and a variety of general methods may be used.

Also, the data processing unit 11 acquires antenna weights from TFB frames received by the communication unit 12. Specifically, when TFB frames are received by the communication unit 12, the communication unit 12 separates the TFB frames on the basis of the information designating the encoding method and encoded reference signals included in the TFB frames. Thereafter, the data processing unit 11 acquires antenna weights of the respective slave stations on the basis of the respective reference signals of the separated TFB frames. Here, the acquired antenna weights are managed by the control unit 17.

The communication unit 12 performs transmission and reception of frames relating to prior communication for space-division multiplexing communication. Specifically, the communication unit 12 transmits the TRQ frame generated by the data processing unit 11 to each of the slave stations, and receives TFB frames from the respective slave stations as responses to the TRQ frame.

(Functions Relating to Uplink Multiplex Transmission Time Period Determination Process)

The control unit 17 determines a permitted transmission time period on the basis of information (hereinafter, also referred to as reverse direction request (RDR) information) indicating transmission time periods (hereinafter, also referred to as requested transmission time periods) which is first information obtained from a plurality of slave stations. Here, the RDR information indicates a time length desired to be used in transmission of user data retained by each slave station. Also, the user data may be a data frame or a management frame. Specifically, the control unit 17 determines the permitted transmission time period on the basis of a transmission time period (hereinafter, also referred to as $R_{max}$) longer than other transmission time periods among transmission time periods indicated by respective pieces of RDR information included in TFB frames received by the communication unit 12 from the plurality of slave stations.

For example, the control unit 17 determines a permitted transmission time period on the basis of an expression $R_{max}+T_{ack}$. Here, $T_{ack}$ indicates a transmission time period (hereinafter, also referred to as an ACK transmission time period) of an acknowledgement (hereinafter, also referred to as ACK) frame of a trigger frame from a master station to a slave station. Here, modulation schemes or modulation rates of an acknowledgement frame in respective slave stations are considered to be the same.

An example in which the control unit 17 determines a permitted transmission time period on the basis of $R_{max}$ has been described above, but the control unit 17 may determine a permitted transmission time period on the basis of a mode of transmission time periods indicated by respective pieces of RDR information included in TFB frames received from a plurality of slave stations. In this case, efficiency in use of wireless communication resources can be improved in comparison with a case in which UL frames are transmitted from slave stations using the permitted transmission time period based on $R_{max}$, in other words, a maximum, depending on bias of transmission time periods indicated by the RDR information.

Also, when the determined permitted transmission time period is greater than a threshold value, the control unit 17 may determine a permitted transmission time period to be a transmission time period which is equal to or less than the threshold value. For example, when the determined permitted transmission time period $R_{max}+T_{ack}$ exceeds a threshold value $G_{limit}$, the control unit 17 determines the threshold value $G_{limit}$ as a permitted transmission time period. In other words, the control unit 17 determines a permitted transmission time period on the basis of, for example, $\min(G_{limit}, R_{max}+T_{ack})$. In this case, the permitted transmission time period is reduced to the threshold value or less, and thus it is possible to cope with even a case in which a transmission time period that can be allocated to slave stations is suppressed due to the status of wireless communication resources, a communication policy of the master station, or the like.

Further, the threshold value $G_{limit}$ may be determined on the basis of information indicating a spare time of a wireless channel or the amount of traffic relating to communication of the master station. For example, the status of wireless communication resources may be indicated by a time ratio (hereinafter, also referred to as an idle time ratio) of carrier sense results in the master station that are determined to be idle or busy, the amount of communication with a communication station connected to the master station, or the like. Thereafter, the threshold value $G_{limit}$ is determined on the basis of the idle time ratio, the amount of traffic, or the like, so that excessive resources are not allocated for transmission of UL frames from slave stations and other communication is not hindered.

Also, an example in which RDR information is information indicating a transmission time period has been described above, but RDR information may be information which enables calculation of a transmission time period. For example, RDR information may be a set of information indicating the amount of data to be transmitted and information indicating a modulation rate. Also, an example in which RDR information is information indicating a transmission time period itself has been described above, but RDR information may be information obtained by quantizing a transmission time period to a predetermined level of granularity.

(Functions Relating to Uplink Multiplex Transmission and Reception Process)

As a processing unit, the data processing unit 11 generates a frame including information (hereinafter, also referred to as reverse direction grant (RDG) information) indicating a permitted transmission time period, which is a first transmission time period, as a first frame. Specifically, the data processing unit 11 generates a DL frame including RDG information indicating the permitted transmission time period determined by the control unit 17 for each slave station. Here, the corresponding DL frame is a trigger for transmission of a UL frame of a slave station, and thus will hereinafter also be referred to as trigger frame.

For example, the data processing unit 11 may include RDG information in a duration/ID field or the like of a MAC header of a trigger frame. Here, a method of adding RDG information is not limited thereto. For example, the data processing unit 11 may add a separate field to a trigger frame and include RDG information in the added field. Also, the corresponding trigger frame may be described below as a data frame. However, the corresponding trigger frame is not limited thereto and may be other frames, such as a control frame, a management frame, or the like.

The communication unit 12 transmits corresponding frames to a plurality of slave stations by multiplexing the frames including information indicating the permitted transmission time period. Specifically, using an antenna weight of each slave station known through a TFB frame, the communication unit 12 space-division multiplexes respective frames generated by the data processing unit 11 and including information indicating the permitted transmission time period.

((Functions of Case of Operating as Slave Station))

Next, functions of a case in which the communication station 10-1 operates as a slave station will be described in detail.

(Functions Relating to Uplink Transmission Time Period Notification Process)

The data processing unit 11 generates a frame as a response to a frame received from a master station and relating to prior communication for space-division multiplexing communication. Specifically, the data processing unit 11 acquires information indicating slave stations which are destinations of a frame included in the corresponding frame received from the master station, and determines whether corresponding information includes the slave station. When the corresponding information includes the slave station as a destination, the data processing unit 11 generates a frame including a reference signal as a response to the corresponding frame. For example, the data processing unit 11 generates a TFB frame as a response to a TRQ frame received from the master station. Here, the reference signal may be inserted into a preamble part.

Further, the data processing unit 11 adds processing to the reference signal on the basis of information for separating TFB frames. For example, the data processing unit 11 encodes the reference signal included in the TFB frame in accordance with an encoding method included in the TRQ frame.

Also, the data processing unit 11 includes RDR information in the TFB frame. For example, the data processing unit 11 generates the RDR information on the basis of a transmission time period determined by the control unit 17, and includes the generated RDR information in the TFB frame. Here, the RDR information indicates a time length desired to be used in transmission of user data retained by each slave station. Also, the user data may be a data frame or a management frame.

Like in the case of a master station, the communication unit 12 performs transmission and reception of frames relating to prior communication for space-division multiplexing communication. Specifically, the communication unit 12 receives a TRQ frame from the master station, and transmits the TFB frame generated by the data processing unit 11 to the master station a predetermined time after reception of the TRQ frame. The corresponding predetermined time is the same for each slave station and may be, for example, a short inter-frame space (SIFS) or the like. Here, the master station may provide a notification of the corresponding predetermined time through a TRQ frame or the like, or the corresponding predetermined time may be a time previously stored in slave stations.

The control unit 17 determines a requested transmission time period that the master station is notified of. Specifically, the control unit 17 determines the requested transmission time period on the basis of the amount of data to be transmitted. For example, the control unit 17 calculates the amount of data to be transmitted with reference to a transmission buffer. Thereafter, the control unit 17 determines the requested transmission time period on the basis of the calculated amount of data and a modulation scheme.

(Functions Relating to Uplink Multiplex Transmission and Reception Process)

The data processing unit 11 generates a frame on the basis of the permitted transmission time period. Specifically, the data processing unit 11 generates the frame so that a transmission time period becomes the permitted transmission time period. More specifically, the data processing unit 11 generates the UL frame to which an acknowledgement frame of a trigger frame received from the master station is connected so that a transmission time period of the UL frame becomes the permitted transmission time period.

For example, the data processing unit 11 first generates a data frame on the basis of data to be transmitted, and subsequently generates an ACK frame of the trigger frame. Thereafter, the data processing unit 11 generates a UL frame by connecting the data frame and the ACK frame together. Here, a position of the ACK frame in the UL frame is arbitrary.

Further, when a transmission time period of the UL frame is shorter than the permitted transmission time period, the data processing unit 11 makes the transmission time period of the UL frame the same as the permitted transmission time period by adding a padding to the UL frame.

Although an example in which a transmission time period of a generated UL frame is equal to or shorter than a permitted transmission time period has been described above, the data processing unit 11 may adjust the UL frame when the transmission time period of the generated UL frame exceeds the permitted transmission time period. Specifically, the data processing unit 11 separates a data frame from the UL frame.

For example, the data processing unit 11 calculates a transmission time period (hereinafter, also referred to as an available transmission time period) which is obtained by subtracting an ACK transmission time period from the transmission time period of the UL frame, and determines whether a transmission time period of the data frame exceeds the available transmission time period. When it is determined that the transmission time period of the data frame exceeds the available transmission time period, the data processing unit 11 divides the data frame using a method such as fragmentation so that transmission time periods become equal to or shorter than the available transmission time period. Here, when the data frame is an aggregation frame, the data processing unit 11 may change the data frame by disconnecting some of subframes of the data frame so that transmission time periods of the data frame become equal to or shorter than the available transmission time period.

In this case, even when a new transmission request is generated after notification of a requested transmission time period or the permitted transmission time period is suppressed to a threshold value or less in the master station, an opportunity for transmission is ensured, and it is possible to improve communication efficiency.

<2-2. Processing of Communication Apparatus>

Figure 3:
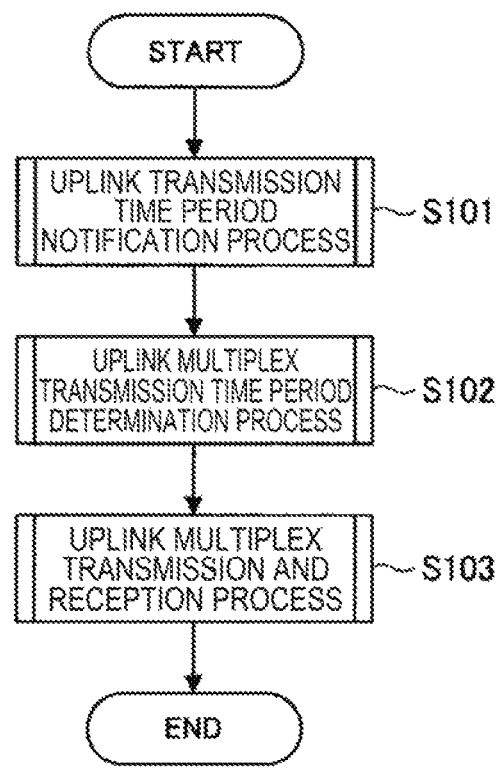
FIG. 3 is a flowchart conceptually showing processing of the communication system according to the present embodiment.

Next, processing of the communication system and the communication stations 10-1 according to the present embodiment will be described with reference to FIGS. 3 to 8. First, the flow of processing of the communication system will be described with reference to FIG. 3. FIG. 3 is a flowchart conceptually showing processing of the communication system according to the present embodiment.

(Flow of Overall Process)

Figure 4:
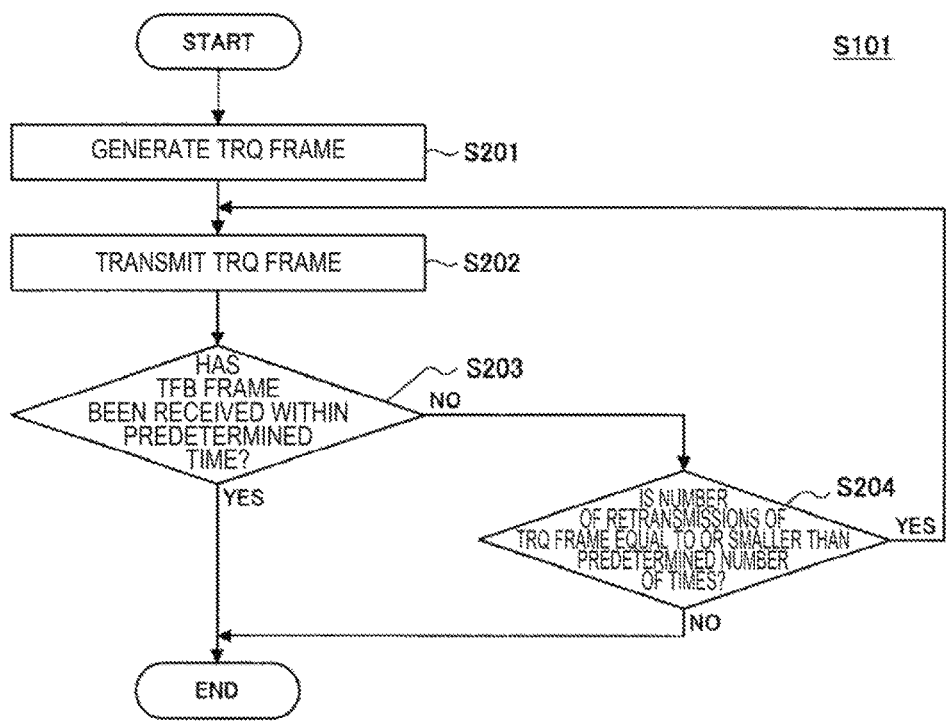
FIG. 4 is a flowchart conceptually showing processing of a master station in an uplink transmission time period notification process according to the present embodiment.
Figure 5:
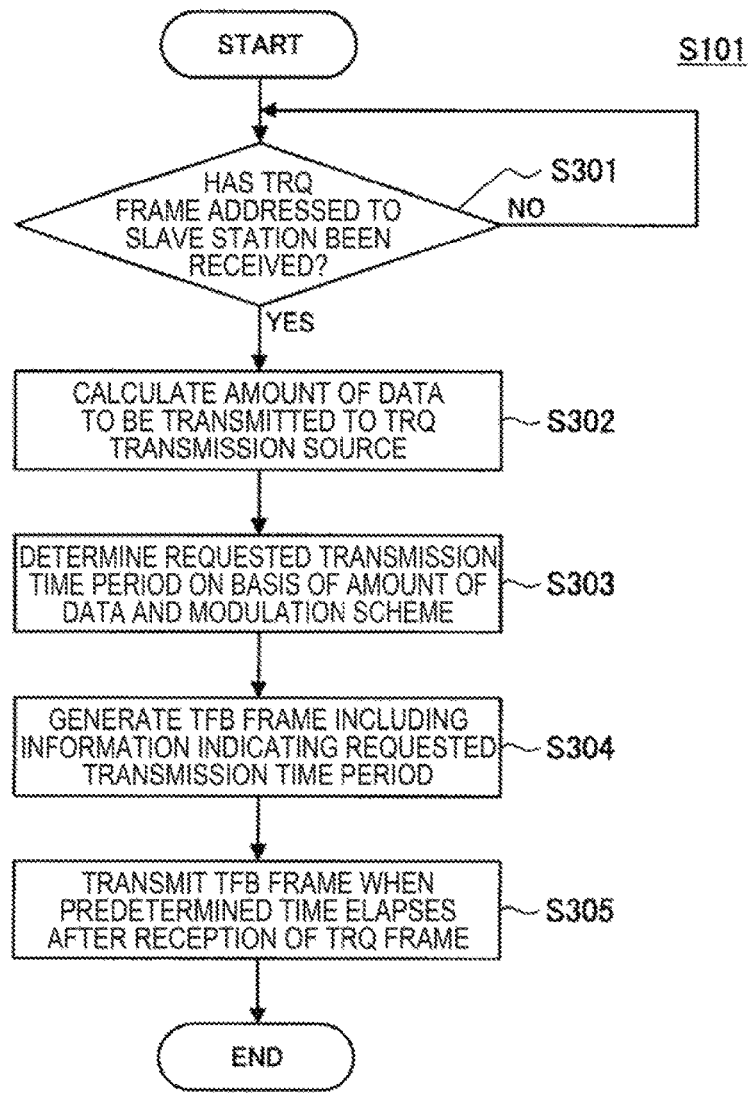
FIG. 5 is a flowchart conceptually showing processing of a slave station in the uplink transmission time period notification process according to the present embodiment.

First, an uplink transmission time period notification process is performed in the communication system (step S101). Specifically, a TRQ frame is transmitted from a master station to the slave stations, and TFB frames including RDR information indicating requested transmission time periods are transmitted from the slave stations to the master station as responses to the corresponding TRQ frame. For example, processes are performed as shown in FIGS. 4 and 5.

Figure 6:
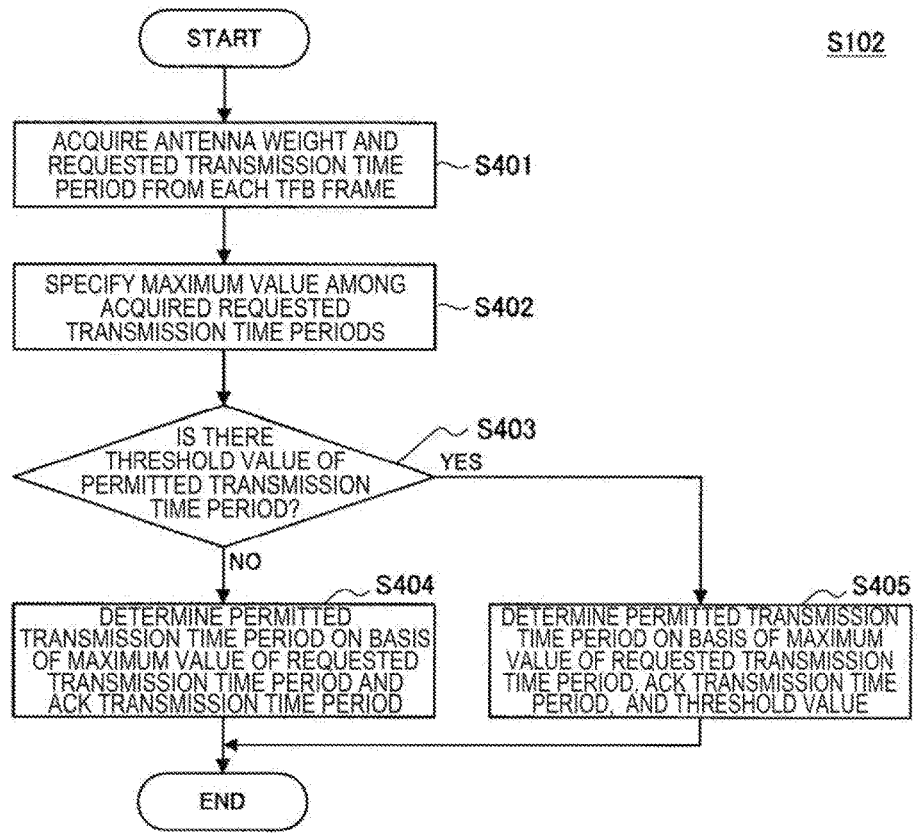
FIG. 6 is a flowchart conceptually showing processing of a master station performing an uplink multiplex transmission time period determination process according to the present embodiment.

Next, an uplink multiplex transmission time period determination process is performed in the communication system (step S102). Specifically, a permitted transmission time period is determined at the master station on the basis of the RDR information included in the TFB frames received from the slave stations. For example, a process is performed as shown in FIG. 6.

Figure 7:
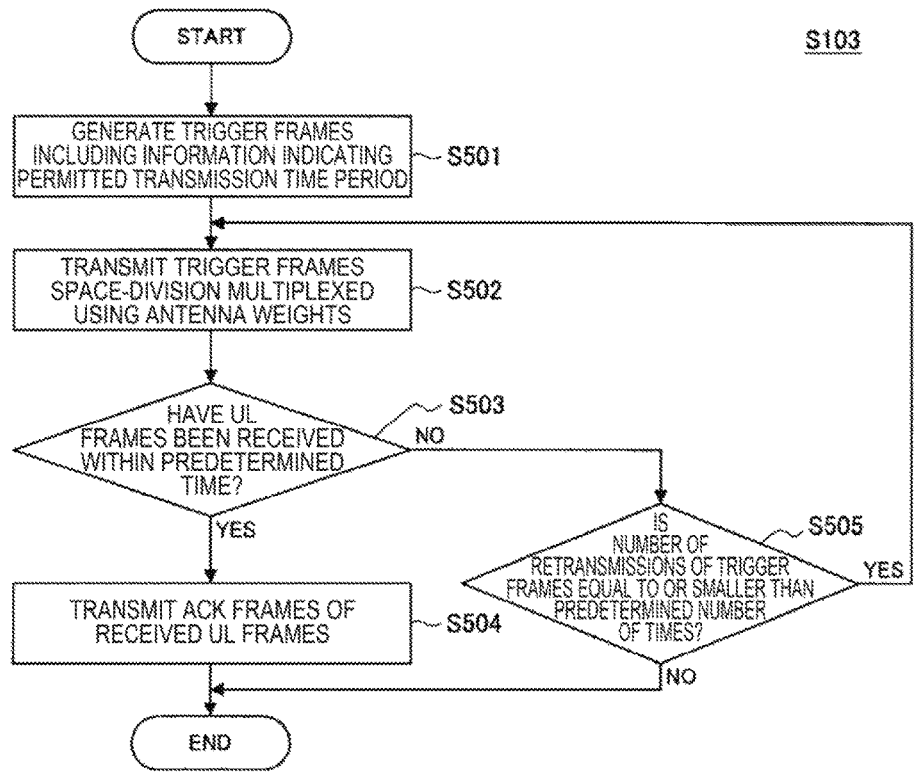
FIG. 7 is a flowchart conceptually showing processing of a master station in an uplink multiplex transmission and reception process according to the present embodiment.
Figure 8:
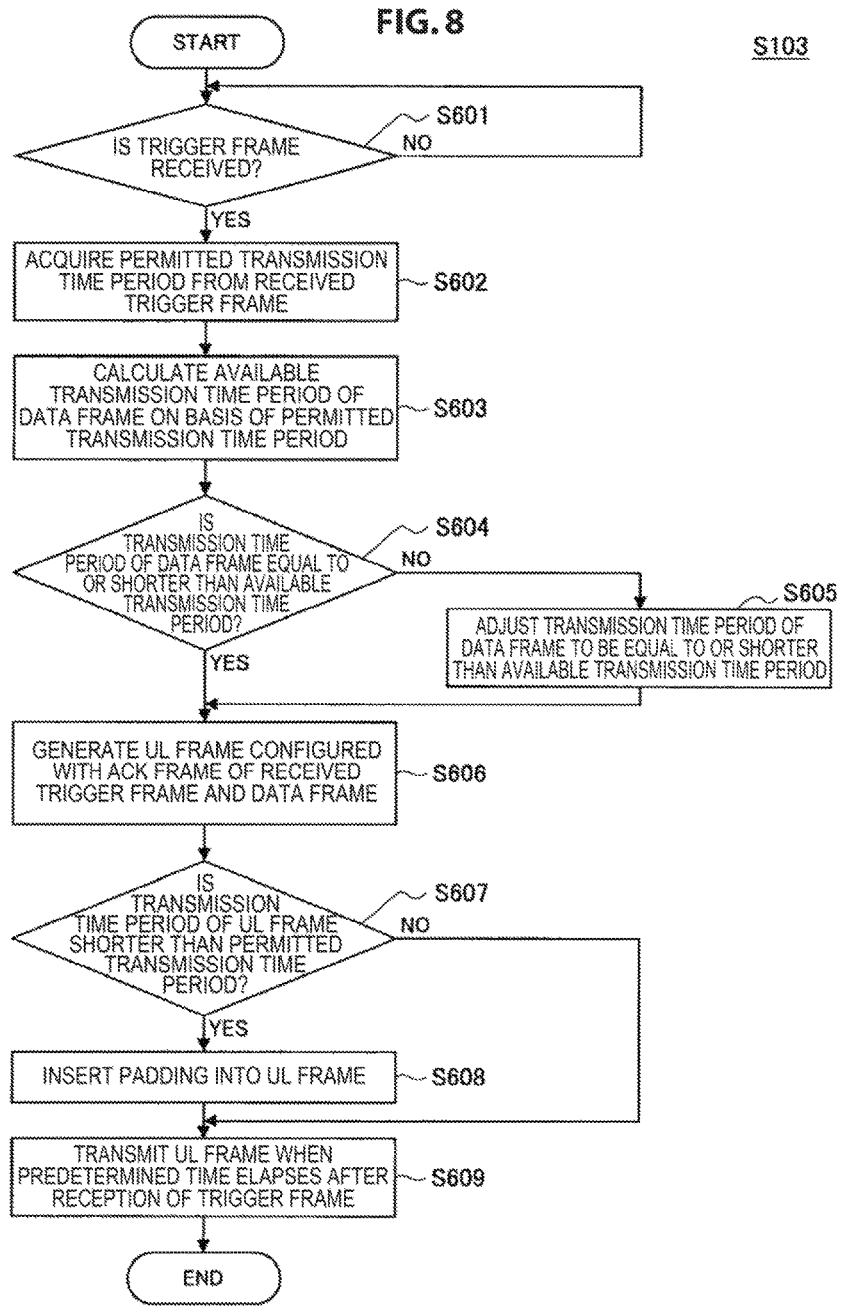
FIG. 8 is a flowchart conceptually showing processing of a slave station in the uplink multiplex transmission and reception process according to the present embodiment.

Next, an uplink multiplex transmission and reception process is performed in the communication system (step S103). Specifically, trigger frames including the RDR information indicating the permitted transmission time period are transmitted from the master station to the slave stations, and a UL frame based on the permitted transmission time period is transmitted from each of the slave stations to the master station. For example, processes are performed as shown in FIGS. 7 and 8.

(Flow of Uplink Transmission Time Period Notification Process)

Details of an uplink transmission time period notification process which is a process of step S101 in FIG. 3 will be described next. First, processing of a master station in the uplink transmission time period notification process will be described with reference to FIG. 4. FIG. 4 is a flowchart conceptually showing processing of a master station in an uplink transmission time period notification process according to the present embodiment.

First, the master station generates a TRQ frame (step S201). Specifically, the data processing unit 11 generates the TRQ frame including information indicating the slave stations which are destinations of the TRQ frame, and information indicating a method of encoding a reference signal.

Next, the master station transmits the TRQ frame (step S202). Specifically, the communication unit 12 transmits the TRQ frame generated by the data processing unit 11 to each of the slave stations.

Next, the master station determines whether a TFB frame has been received within a predetermined time (step S203). Specifically, the control unit 17 waits the predetermined time to receive TFB frames. Thereafter, when the corresponding predetermined time elapses, the control unit 17 determines whether a TFB frame is received from each of the slave stations which are destinations of the TRQ frame. For example, when TFB frames are received during the corresponding predetermined time, the communication unit 12 separates the TFB frames in accordance with the encoding method known to the slave stations through the TRQ frame. Thereafter, when the corresponding predetermined time elapses, the control unit 17 determines whether the TFB frames obtained by separation have been received from all of the slave stations which are the destinations of the TRQ frame.

When it is determined that TFB frames have not been received within the predetermined time, the master station determines whether the number of retransmissions of the TRQ frame is equal to or smaller than a predetermined number of times (step S204). Specifically, when it is determined that no TFB frame has been received from any one of the slave stations which are the destinations of the TRQ frame within the predetermined time, the control unit 17 determines whether the number of retransmissions of the TRQ frame is equal to or smaller than the predetermined number of times.

When it is determined that the number of retransmissions of the TRQ frame is equal to or smaller than the predetermined number of times, the master station returns to step S202 and performs retransmission of the TRQ frame. Specifically, when it is determined that the number of retransmissions of the TRQ frame is equal to or smaller than the predetermined number of times, the control unit 17 causes the communication unit 12 to retransmit the TRQ frame to a slave station relating to a TFB frame which has not been received. Here, the TRQ frame may be retransmitted to all of the slave stations which are the original destinations of the TRQ frame.

When it is determined in step S203 that TFB frames have been received within the predetermined time, the master station continues the process and changes over to an uplink multiplex transmission time period determination process which is a next process. Here, when it is determined in step S204 that the number of retransmissions of the TRQ frame exceeds the predetermined number of times, the master station ends the process without retransmitting the TRQ frame.

Processing of a slave station in an uplink transmission time period notification process will be described next with reference to FIG. 5. FIG. 5 is a flowchart conceptually showing processing of a slave station in the uplink transmission time period notification process according to the present embodiment.

First, a slave station determines whether a TRQ frame addressed to the slave station has been received (step S301). Specifically, when a TRQ frame is received by the communication unit 12, the data processing unit 11 determines whether the corresponding TRQ frame is a TRQ frame addressed to the slave station with reference to information indicating a slave station which is a destination included in the TRQ frame.

When it is determined that a TRQ frame addressed to the slave station has been received, the slave station calculates the amount of data to be transmitted to a TRQ transmission source (step S302). Specifically, when a TRQ frame addressed to the slave station is received, the control unit 17 calculates the amount of data to be transmitted with reference to a transmission buffer.

Next, the slave station determines a requested transmission time period on the basis of the amount of data and a modulation scheme (step S303). Specifically, the control unit 17 determines a requested transmission time period on the basis of the calculated amount of data and a selected modulation scheme. For example, the control unit 17 determines the requested transmission time period on the basis of a modulation rate decided by the amount of data and the modulation scheme.

Next, the slave station generates a TFB frame including information indicating the requested transmission time period (step S304). Specifically, the data processing unit 11 generates RDR information indicating the requested transmission time period determined by the control unit 17. Thereafter, the data processing unit 11 generates the TFB frame including a reference signal encoded in accordance with an encoding scheme known through the TRQ frame and the RDR information.

Next, the slave station transmits the TFB frame a predetermined time after reception of the TRQ frame (step S305). Specifically, the control unit 17 causes the communication unit 12 to transmit the TFB frame to the master station when the predetermined time elapses after the TRQ frame is received.

(Flow of Uplink Multiplex Transmission Time Period Determination Process)

Details of an uplink multiplex transmission time period determination process which is the process of step S102 in FIG. 3 will be described with reference to FIG. 6 continuously. FIG. 6 is a flowchart conceptually showing processing of a master station performing an uplink multiplex transmission time period determination process according to the present embodiment.

First, the master station acquires an antenna weight and a requested transmission time period from each TFB frame (step S401). Specifically, the data processing unit 11 calculates antenna weights on the basis of reference signals of the TFB frames separated by the communication unit 12. Also, the data processing unit 11 acquires information indicating requested transmission time periods from the TFB frames.

Next, the master station specifies a maximum value among the acquired requested transmission time periods (step S402). Specifically, the control unit 17 compares the requested transmission time periods acquired from the TFB frames with each other and specifies a maximum value $R_{max}$ among the corresponding requested transmission time periods.

Next, the master station determines whether there is a threshold value of a permitted transmission time period (step S403). Specifically, the control unit 17 determines whether or not a threshold value of a permitted transmission time period has been set. Here, whether or not a threshold value of a permitted transmission time period has been set and the value may be previously stored in a storage unit or the like separately provided in the communication station 10-1, or may be changed in accordance with the status of wireless communication resources, a communication policy of the master station, or the like. Here, the status of wireless communication resources may be indicated by, for example, an idle time ratio per unit time of carrier sensing at the master station, the amount of traffic between the master station and a partner connected to the master station, or the like. Thereafter, the threshold value Glum is set on the basis of the idle time ratio, the amount of traffic, or the like so that excessive resources are not allocated for transmission of UL frames from slave stations and other communication is not hindered. Also, when it is fixed whether or not a threshold value has been set, the present process may not be performed.

When it is determined that there is no threshold value of a permitted transmission time period, the master station determines a permitted transmission time period on the basis of the maximum value of requested transmission time periods and an ACK transmission time period (step S404). Specifically, the control unit 17 determines the sum of the maximum value $R_{max}$ of requested transmission time periods and the ACK transmission time period $T_{ack}$ as a permitted transmission time period.

When it is determined that there is a threshold value of a permitted transmission time period, the master station determines a permitted transmission time period on the basis of the maximum value of requested transmission time periods, the ACK transmission time period, and the threshold value (step S405). Specifically, the control unit 17 determines the smaller value between the sum of the maximum value $R_{max}$ of requested transmission time periods and the ACK transmission time period $T_{ack}$ and the threshold value $G_{limit}$ of a permitted transmission time period as a permitted transmission time period.

(Flow of Uplink Multiplex Transmission and Reception Process)

Details of an uplink multiplex transmission and reception process which is the process of step S103 in FIG. 3 will be described next. First, processing of the master station in the uplink multiplex transmission and reception process will be described with reference to FIG. 7. FIG. 7 is a flowchart conceptually showing processing of a master station in an uplink multiplex transmission and reception process according to the present embodiment.

First, the master station generates trigger frames including information indicating the permitted transmission time period (step S501). Specifically, the data processing unit 11 generates RDG information indicating the permitted transmission time period determined by the control unit 17 and generates trigger frames including the generated RDG information.

Next, the master station transmits the trigger frames which are space-division multiplexed using the antenna weights (step S502). Specifically, the communication unit 12 performs a process for space-division multiplexing the trigger frames using the calculated antenna weights and transmits the processed trigger frames to the slave stations.

Next, the master station determines whether UL frames have been received within a predetermined time (step S503). Specifically, the control unit 17 waits the predetermined time to receive UL frames. At this time, the control unit 17 retains the antenna weights which have been used to transmit the trigger frames. Thereafter, when the corresponding predetermined time elapses, the control unit 17 determines whether a UL frame has been received from each of the slave stations which are destinations of the trigger frames. For example, when UL frames are received during the corresponding predetermined time, the communication unit 12 separates the UL frames using the retained antenna weights. Thereafter, the control unit 17 determines whether UL frames obtained by separation have been received from all of the slave stations which are the destinations of the trigger frames after lapse of the corresponding predetermined time. In the present process, the data processing unit 11 may acquire data from the UL frames.

When it is determined that UL frames have been received within the predetermined time, the master station transmits ACK frames of the received UL frames (step S505). Specifically, when it is determined that UL frames have been received within the predetermined time, the data processing unit 11 generates ACK frames corresponding to each of the UL frames. Thereafter, the communication unit 12 performs a process for space-division multiplexing the generated ACK frames and transmits the processed ACK frames to the slave stations.

When it is determined that UL frames have not been received within the predetermined time, the master station determines whether the number of retransmissions of the trigger frames is equal to or smaller than a predetermined number of times (step S505). When it is determined that the corresponding number of retransmissions of the trigger frames is equal to or smaller than the predetermined number of times, the master station returns to step S502 and retransmits the trigger frames. Here, since the process has substantially the same details as the process of step S204 in FIG. 4, the description thereof will be omitted.

Processing of the slave station in the uplink multiplex transmission and reception process will be described next with reference to FIG. 8. FIG. 8 is a flowchart conceptually showing processing of a slave station in the uplink multiplex transmission and reception process according to the present embodiment.

First, the slave station waits until a trigger frame is received (step S601).

When a trigger frame is received, the slave station acquires the permitted transmission time period from the received trigger frame (step S602). Specifically, when a trigger frame is received, the communication unit 12 corrects a frequency offset of a reference oscillator with respect to the master station using a signal in a preamble (a physical layer (PHY) preamble or the like) of the corresponding trigger frame. This is because it may be very difficult to extract a signal from a received transmission wave when frequencies of the master station and the slave station are not identical to each other. Thereafter, the data processing unit 11 acquires RDG information indicating a permitted transmission time period from the corresponding trigger frame.

Next, the slave station calculates an available transmission time period of a data frame on the basis of the permitted transmission time period (step S603). Specifically, the control unit 17 calculates an available transmission time period of a data frame by calculating a difference between the permitted transmission time period and the ACK transmission time period.

Next, the slave station determines whether a transmission time period of a data frame is equal to or shorter than the available transmission time period (step S604). Specifically, the control unit 17 determines whether a transmission time period of a data frame is equal to or shorter than the calculated available transmission time period.

When the transmission time period of a data frame is not equal to or shorter than the available transmission time period, the slave station adjusts the transmission time period of a data frame to be equal to or shorter than the available transmission time period (step S605). Specifically, the data processing unit 11 performs fragmentation so that a transmission time period of any one part of a data frame obtained by fragmenting the data frame becomes equal to or shorter than the available transmission time period.

Next, the slave station generates a UL frame configured with an ACK frame of the received trigger frame and the data frame (step S606). Specifically, when the transmission time period of a data frame becomes equal to or shorter than the available transmission time period, the data processing unit 11 generates a data frame and also generates an ACK frame of the trigger frame. Thereafter, the data processing unit 11 generates a UL frame by connecting the data frame and the ACK frame together.

Next, the slave station determines whether a transmission time period of the UL frame is shorter than the permitted transmission time period (step S607). Specifically, the data processing unit 11 determines whether the transmission time period of the UL frame is shorter than the permitted transmission time period.

When it is determined that the transmission time period of the UL frame is shorter than the permitted transmission time period, the slave station inserts a padding into the UL frame (step S608). Specifically, when it is determined that the transmission time period of the UL frame is shorter than the permitted transmission time period, the data processing unit 11 inserts paddings into the UL frame until the transmission time period of the UL frame becomes the same as the permitted transmission time period length.

Next, the slave station transmits the UL frame a predetermined time after reception of the trigger frame (step S609). Specifically, when the predetermined time elapses after reception of the trigger frame, the control unit 17 causes the communication unit 12 to transmit the generated UL frame to the master station.

(Frame Exchange Sequence in Present Embodiment)

Figure 9:
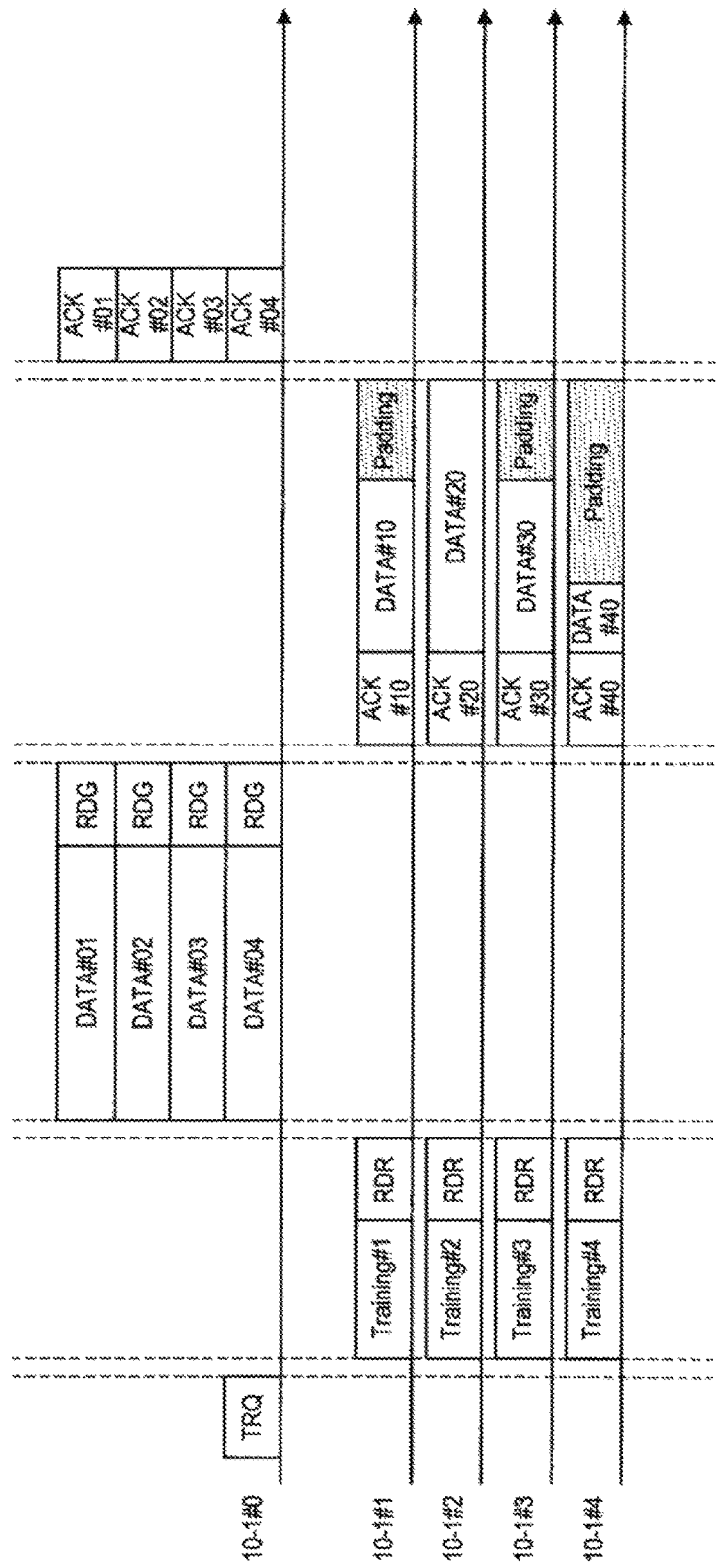
FIG. 9 is a diagram showing an example of a frame exchange sequence performed by the communication system according to the present embodiment.

Processing of the communication system in the present embodiment has been described above. Next, transmission and reception of frames performed in the communication system will be described with reference to FIG. 9. FIG. 9 is a diagram showing an example of a frame exchange sequence performed by the communication system according to the present embodiment.

First, a master station 10-1#0 transmits a TRQ frame to each of slave stations 10-1#1 to 10-1#4. For example, the TRQ frame is transmitted by broadcasting, multicasting, or the like.

Next, each of the slave stations 10-1#1 to 10-1#4 transmits a TFB frame as a response to the TRQ frame. For example, as shown in FIG. 9, each of TFB frames includes any one of training signal parts Training#1 to Training#4 in which reference signals are positioned and RDR information. Here, the training signal parts are encoded.

Next, the master station 10-1#0 transmits trigger frames to the respective slave stations 10-1#1 to 10-1#4 using a space-division multiplexing scheme. For example, each of the trigger frames includes any one of data parts DATA#01 to DATA#04 and RDG information as shown in FIG. 9.

Next, each of the slave stations 10-1#1 to 10-1#4 transmits a UL frame to the master station 10-1#0. For example, a UL frame of the slave station 10-1#2 is configured with only an ACK frame and a data frame as shown in FIG. 9 because a requested transmission time period indicated by RDR information in a TFB frame of the slave station 10-1#2 is the maximum. On the other hand, paddings are added to UL frames of the slave stations 10-1#1, 10-1#3, and 10-1#4 to compensate for the shortage of a transmission time period.

Next, the master station 10-1#0 transmits ACK frames of the received UL frames to the slave stations 10-1#1 to 10-1#4.

As described above, according to the first embodiment of the present disclosure, a master station receives frames including first information from a plurality of slave stations, and transmits first frames including information indicating a permitted transmission time period to the plurality of slave stations. Also, the master station determines the permitted transmission time period on the basis of a plurality of pieces of the first information and generates the corresponding first frames. Thus, the permitted transmission time period suitable for situations of the slave stations is determined, and transmission time periods of frames to be transmitted are made the same as the corresponding permitted transmission time period. In this way, it is possible to reconcile efficient use of wireless communication resources with stabilization of reception performance. Also, since the master station side determines the permitted transmission time period and notifies the slave stations of the permitted transmission time period, a process of determining a transmission time period is not performed on the slave station side, and it is possible to achieve simplification of a process and power saving at the slave stations.

Also, the first information includes information indicating transmission time periods desired by the plurality of slave stations to be used for transmission of user data. For this reason, the permitted transmission time period is directly determined in accordance with transmission time periods scheduled by the slave stations, so that a process of determining a permitted transmission time period on the master station side can be simplified.

Also, the transmission time periods are determined on the basis of the amount of data to be transmitted. For this reason, the permitted transmission time period may be changed in accordance with the variable amount of transmission data, and thus it is possible to give flexibility to a process of determining a permitted transmission time period.

Also, the master station determines the permitted transmission time period on the basis of a transmission time period longer than other transmission time periods among transmission time periods indicated by respective pieces of the first information. For this reason, there is no excess or deficiency of a transmission time period of a UL frame of a slave station which requests a longer transmission time period than other slave stations, and thus it is possible to suppress the waste of wireless communication resources to be used.

Also, the frames including the first information include reference signals, and the master station transmits frames indicating transmission requests of frames including the first information to the plurality of slave stations. For this reason, communication efficiency can be improved by acquiring information for determining a permitted transmission time period in a conventional process of exchanging TRQ/TFB frames.

Also, the frames including the first information are multiplexed by encoding the reference signals. For this reason, the respective slave stations can transmit TFB frames at the same timing, and it is possible to shorten transmission time periods occupied by a process of exchanging TRQ/TFB frames and further reduce used wireless communication resources.

Also, the master station acquires antenna weights on the basis of the corresponding reference signals, and transmits the first frames to the plurality of slave stations by space-division multiplexing the first frames using the corresponding antenna weights. For this reason, trigger frames are transmitted at the same timing, and thus it is possible to improve efficiency in frequency use and communication.

Also, according to the first embodiment of the present disclosure, the slave stations transmit the frames including the first information to the master station and receive the first frames including the information indicating the permitted transmission time period determined by the master station on the basis of a plurality of pieces of the first information. Further, the slave stations generate frames on the basis of the information indicating the permitted transmission time period. For this reason, transmission time periods suitable for situations of the slave stations are determined, and thus it is possible to reconcile stabilization of reception power on the master station side with efficient use of wireless communication resources.

Also, the slave stations generate frames so that transmission time periods become the permitted transmission time period. For this reason, by making the transmission time periods of the frames transmitted from the slave stations the same as the permitted transmission time period, an abrupt change in reception power is suppressed during reception of the multiplexed frames at the master station, and it is possible to stabilize reception performance.

Also, the slave stations generate frames to which frames that are acknowledgements of the first frames are connected. For this reason, unlike a case in which an acknowledgement frame and a data frame are independently transmitted, a transmission interval of each frame is not provided, and it is possible to shorten a time period relating to transmission of both frames.

Also, when a transmission time period is shorter than the permitted transmission time period, a slave station adds a padding to a frame. For this reason, even when it is difficult to make the transmission time period the same as the permitted transmission time period with only a data frame, it is possible to stabilize reception performance.

<2-3. Variations>

The first embodiment of the present disclosure has been described above. Here, the present embodiment is not limited to the examples described above. First to third variations of the present embodiment will be described below.

(First Variation)

In a first variation of the present embodiment, the master station may not allow a slave station which requests a transmission time period greater than the threshold value to transmit a UL frame. Specifically, the control unit 17 controls the data processing unit 11 or the communication unit 12 so that a trigger frame is not transmitted to a slave station which is a transmission source of a frame including RDR information indicating a requested transmission time period greater than the threshold value.

For example, the control unit 17 may cause the data processing unit 11 not to generate a trigger frame addressed to a slave station relating to a requested transmission time period greater than the threshold value, or to exclude the slave station relating to the requested transmission time period greater than the threshold value from destinations of trigger frames. Also, the control unit 17 may cause the data processing unit 11 to generate a frame which does not include RDG information indicating a permitted transmission time period instead of a trigger frame, and may not cause the communication unit 12 to transmit the generated frame.

As described above, according to the first variation of the present embodiment, the control unit 17 controls the data processing unit 11 so that a trigger frame is not transmitted to a slave station which is a transmission source of a frame including RDR information indicating a requested transmission time period greater than the threshold value. For this reason, when a permitted transmission time period shorter than a requested transmission time period is determined, a process of adjusting a UL frame to be transmitted is not provided in a slave station, and it is possible to simplify processing of the slave station.

(Second Variation)

In a second variation of the present embodiment, transmission power used by slave stations to transmit UL frames may be controlled. Specifically, the data processing unit 11 includes information designating transmission power in trigger frames.

For example, the control unit 17 generates information designating transmission power for each slave station on the basis of reception power of respective frames previously received from the slave stations. Here, the information designating transmission power may be generated for only some of the plurality of slave stations.

Next, the data processing unit 11 includes the information designating transmission power used by the slave stations to transmit UL frames in trigger frames. Thereafter, the communication unit 12 transmits the trigger frames generated by the data processing unit 11.

Slave stations which have received the trigger frames including the information designating transmission power set transmission power in accordance with the corresponding information included in the trigger frames. Thereafter, the slave stations transmit UL frames to the master station using the set transmission power.

As described above, according to the second variation of the present embodiment, the data processing unit 11 in the master station includes information designating transmission power used for frames transmitted from a plurality of slave stations to the master station in trigger frames. For this reason, the transmission power may be dynamically changed, and thus it is possible to stabilize reception performance of the master station.

Also, the transmission power is designated so that a difference in reception power between respective frames transmitted from a plurality of other communication apparatuses to a communication apparatus is small at the communication apparatus. For this reason, when transmission power varies depending on a slave station, it is possible to prevent transmission waves for which transmission power lower than transmission power of other slave stations is used are weakened by transmission waves of the other slave stations, and to prevent communication quality of a UL frame from being degraded.

Although an example in which a master station designates transmission power has been described above, a slave station may control transmission power even when no designation of transmission power is performed by the master station. For example, the control unit 17 estimates propagation loss of transmission waves on the basis of previously acquired information on reception power at the master station. Here, the reception power information may be included in a trigger frame. Subsequently, the control unit 17 sets transmission power on the basis of the estimated propagation loss so that reception power at the master station side becomes a predetermined value. Thereafter, the communication unit 12 transmits a UL frame to the master station using the set transmission power. In this case, communication for designating transmission power is not performed, and it is possible to use wireless communication resources for other purposes or uses.

(Third Variation)

In a third variation of the present embodiment, the master station may separate space-division multiplexed UL frames using antenna weights obtained from the corresponding UL frames. Specifically, the UL frames include reference signals, and the communication unit 12 separates the reference signals included in the received multiplexed UL frames. Thereafter, the data processing unit 11 calculates antenna weights from the separated reference signals, and the communication unit 12 separates the multiplexed UL frames using the calculated antenna weights. Here, the reference signals may be encoded using different orthogonal codes or the like for different slave stations so that they are separable.

More specifically, the slave stations transmit UL frames including reference signals encoded by an encoding method previously designated by the master station due to a TRQ frame or the like to the master station.

In the master station, when the UL frames are received from the slave stations, the communication unit 12 separates the reference signals of the UL frames in accordance with the encoding method used by the slave stations. Subsequently, the data processing unit 11 calculates antenna weights on the basis of separated reference signals, and the control unit 17 updates retained antenna weights, for example, antenna weights at the time of the TRQ/TFB frame exchange described above, with the calculated antenna weights. Thereafter, the communication unit 12 separates the space-division multiplexed UL frames using the updated antenna weights.

As described above, according to the third variation of the present embodiment, a master station separates space-division multiplexed UL frames using antenna weights obtained from the corresponding UL frames. For this reason, even when antenna weights are not previously obtained, it is possible to separate space-division multiplexed frames. Also, even when antenna weights can be previously acquired, it is possible to perform a process of separating frames using newer antenna weights, and it is possible to improve communication quality.

<3. Second Embodiment (Example of Dividing UL Frame)>

Communication apparatuses 10-1 according to the first embodiment of the present disclosure have been described above. Next, communication apparatuses 10-2 according to a second embodiment of the present disclosure will be described. A slave station among communication apparatuses 10-2 according to the present embodiment divides a UL frame into an acknowledgement frame and a data frame and transmits each of the divided frames to a master station in an independent transmission time period.

<3-1. Configuration of Communication Apparatus>

A functional configuration of a communication apparatus 10-2 is substantially the same as the functional configuration according to the first embodiment, but the data processing unit 11 and the control unit 17 have partially different functions in both a master station and a slave station. Here, the description of functions which are substantially the same as functions of the first embodiment will be omitted.

((Functions of Case of Operating as Master Station))

First, functions of a case in which the communication station 10-2 operates as a master station will be described in detail.

(Functions Relating to Uplink Transmission Time Period Notification Process)

The data processing unit 11 generates a TRQ frame for each slave station which is a transmission destination. Specifically, the data processing unit 11 sets a destination of a TRQ frame as a single slave station and includes only information which enables specifying of the single slave station, for example, a single MAC address or the like, in the TRQ frame. Here, unlike the first embodiment, the data processing unit 11 may not include information indicating an encoding method for encoding a reference signal of a TFB frame in the TRQ frame. This is for the purpose of exchanging TRQ/TFB frames with each single slave station.

The control unit 17 performs a TRQ/TFB frame exchange process for each targeted slave station. Specifically, the control unit 17 causes the data processing unit 11 to generate a TRQ frame for each slave station which is a target of communication, and causes the communication unit 12 to transmit the generated TRQ frame.

(Functions Relating to Uplink Multiplex Transmission Time Period Determination Process)

When a slave station is instructed to divide a UL frame, the control unit 17 determines two kinds of permitted transmission time periods. Specifically, when any one of TFB frames including RDR information indicates that a slave station does not transmit a UL frame as a response to a trigger frame, the control unit 17 separately determines permitted transmission time periods for an acknowledgement frame and a UL frame.

For example, the control unit 17 determines whether a requested transmission time period indicated by RDR information included in a TFB frame received from a slave station is 0 or a value corresponding to 0. When it is determined that the requested transmission time period is 0 or a value corresponding to 0, the control unit 17 determines a permitted transmission time period of an ACK frame to be $T_{ack}$ and determines a permitted transmission time period of a UL frame on the basis of an expression $R_{max}+T_{IFS}+T_{ack}$. Here, $T_{IFS}$ indicates a transmission interval inter-frame space (IFS) between the ACK frame and a follow-up data frame. Here, information indicating the permitted transmission time period of the ACK frame is also referred to as $RDG_0$, and information indicating the permitted transmission time period of the UL frame is also referred to as $RDG_1$.

Also, when a threshold value is provided for a permitted transmission time period, the control unit 17 may determine the permitted transmission time period of the UL frame on the basis of an expression $\min(G_{limit}, R_{max}+T_{IFS}+T_{ack})$.

(Functions Relating to Uplink Multiplex Transmission and Reception Process)

The data processing unit 11 includes information instructing division of a UL frame transmitted by a slave station in a trigger frame. Specifically, when any one of TFB frames including RDR information indicates that a slave station does not transmit a UL frame as a response to a trigger frame, the data processing unit 11 includes information instructing transmission of an acknowledgement frame of a trigger frame in an independent transmission time period in the trigger frame.

For example, a trigger frame may include a flag Split_Ack_Flag as the information instructing transmission of an acknowledgement frame of the trigger frame in an independent transmission time period. The data processing unit 11 determines whether a requested transmission time period indicated by RDR information included in a TFB frame received from a slave station is 0 or a value corresponding to 0. When it is determined that the requested transmission time period is 0 or a value corresponding to 0, the data processing unit 11 may insert a flag which is turned on, in other words, Split_Ack_Flag=1, at a predetermined position in a trigger frame, for example, a part of a reserved area in a MAC header. Here, an insertion position of the corresponding flag is not limited thereto. For example, another dedicated field may be added to the trigger frame, and the corresponding flag may be inserted into the added field.

Although an example in which a flag is included in a trigger frame when a requested transmission time period is 0 has been described above, when a TFB frame including RDR information indicating a requested transmission time period is not received, the data processing unit 11 may include the corresponding flag in a trigger frame.

Also, the data processing unit 11 includes information indicating two kinds of permitted transmission time periods in a trigger frame. Specifically, the data processing unit 11 includes RDG information indicating a permitted transmission time period of an ACK frame and a permitted transmission time period of a UL frame determined by the control unit 17 in a trigger frame.

Here, when the permitted transmission time period of an ACK frame is known to a slave station, the data processing unit 11 may not include information indicating the permitted transmission time period of an ACK frame in a trigger frame. Also, the data processing unit 11 may not include the permitted transmission time period of a UL frame in a trigger frame relating to a slave station whose requested transmission time period is 0.

((Functions of Case of Operating as Slave Station))

Next, functions of a case in which the communication station 10-2 operates as a slave station will be described in detail.

(Functions Relating to Uplink Transmission Time Period Notification Process)

Since the data processing unit 11 has substantially the same functions as that in the first embodiment except that a reference signal included in a TFB frame is not encoded, the description thereof will be omitted.

When there is no data to be transmitted, the control unit 17 determines a requested transmission time period to be 0. Specifically, when there is no data to be transmitted in a transmission buffer, the control unit 17 determines a requested transmission time period to be 0 or a value corresponding to 0. Here, when there is no data to be transmitted, the control unit 17 may perform control so that the data processing unit 11 does not generate a TFB frame or the communication unit 12 does not transmit a TFB frame. Also, when there is no data to be transmitted, the control unit 17 may cause the data processing unit 11 to generate a TFB frame including information indicating that there is no data to be transmitted, no UL frame is transmitted, or the like.

(Functions Relating to Uplink Multiplex Transmission and Reception Process)

When information instructing division of a UL frame is included in a trigger frame, the data processing unit 11 divides the UL frame. Specifically, when information instructing transmission of an acknowledgement of a trigger frame in an independent transmission time period is included in a trigger frame, the data processing unit 11 generates a frame as the corresponding acknowledgement which is independently transmitted.

For example, when a trigger frame is received, the data processing unit 11 determines whether a flag is included or content of a flag is predetermined content, for example, that the flag is turned on, in other words, Split_Ack_Flag=1. When it is determined that the flag is turned on, the data processing unit 11 generates an ACK frame of the trigger frame on the basis of a permitted transmission time period of an ACK frame.

Next, the data processing unit 11 determines whether there is data to be transmitted, in other words, a requested transmission time period indicated by RDR information included in a TFB frame is 0. When it is determined that there is data to be transmitted, the data processing unit 11 generates a data frame on the basis of a permitted transmission time period of a UL frame. At this time, the data frame is generated in consideration of the transmission interval $T_{IFS}$ between an ACK frame and a data frame. Also, when it is determined that there is no data to be transmitted, a data frame is neither generated nor transmitted.

When a UL frame is divided, the control unit 17 causes the communication unit 12 to transmit each of divided frames in a permitted transmission time period of each divided frame. Specifically, when both of an ACK frame and a data frame are separately generated, the control unit 17 causes the communication unit 12 to first transmit only the ACK frame to a master station in the same transmission time period as other slave stations, in other words, in the permitted transmission time period of an ACK frame. Also, when a predetermined transmission interval elapses after transmission of the corresponding ACK frame, the control unit 17 causes the communication unit 12 to transmit the data frame to the master station in a permitted transmission time period.

Although an example in which an ACK frame is transmitted in advance of a data frame has been described above, an ACK frame may be transmitted after a data frame.

<3-2. Processing of Communication Apparatus>

Figure 10:
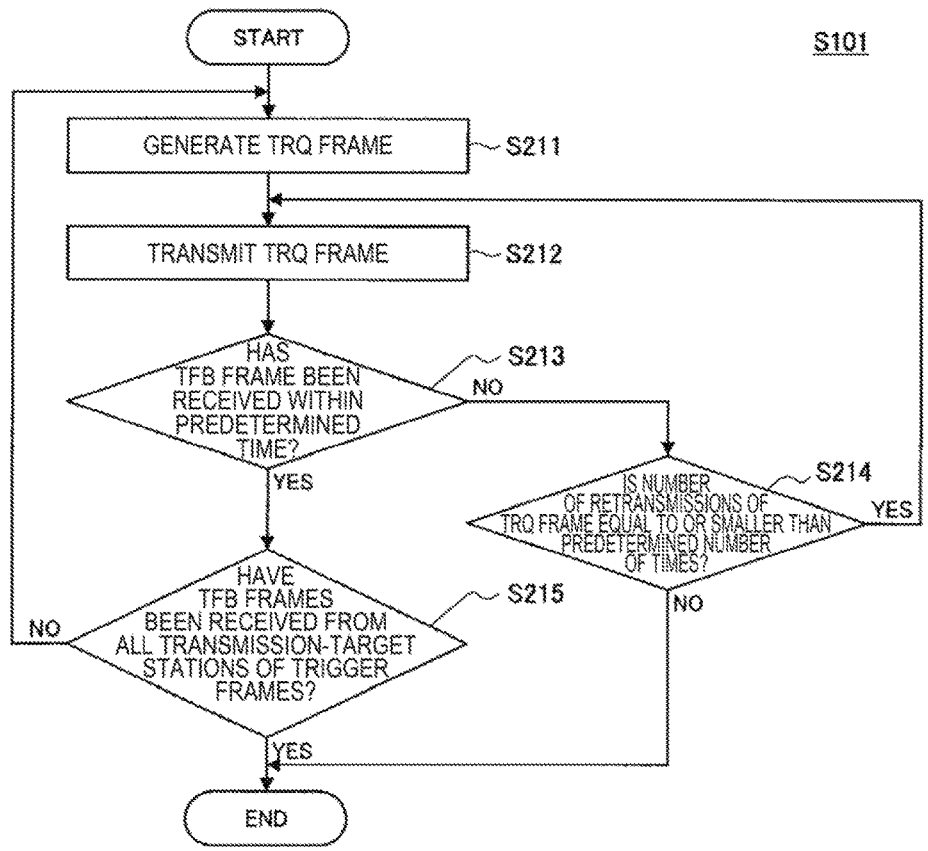
FIG. 10 is a flowchart conceptually showing processing of a master station in an uplink transmission time period notification process according to a second embodiment of the present disclosure.
Figure 11:
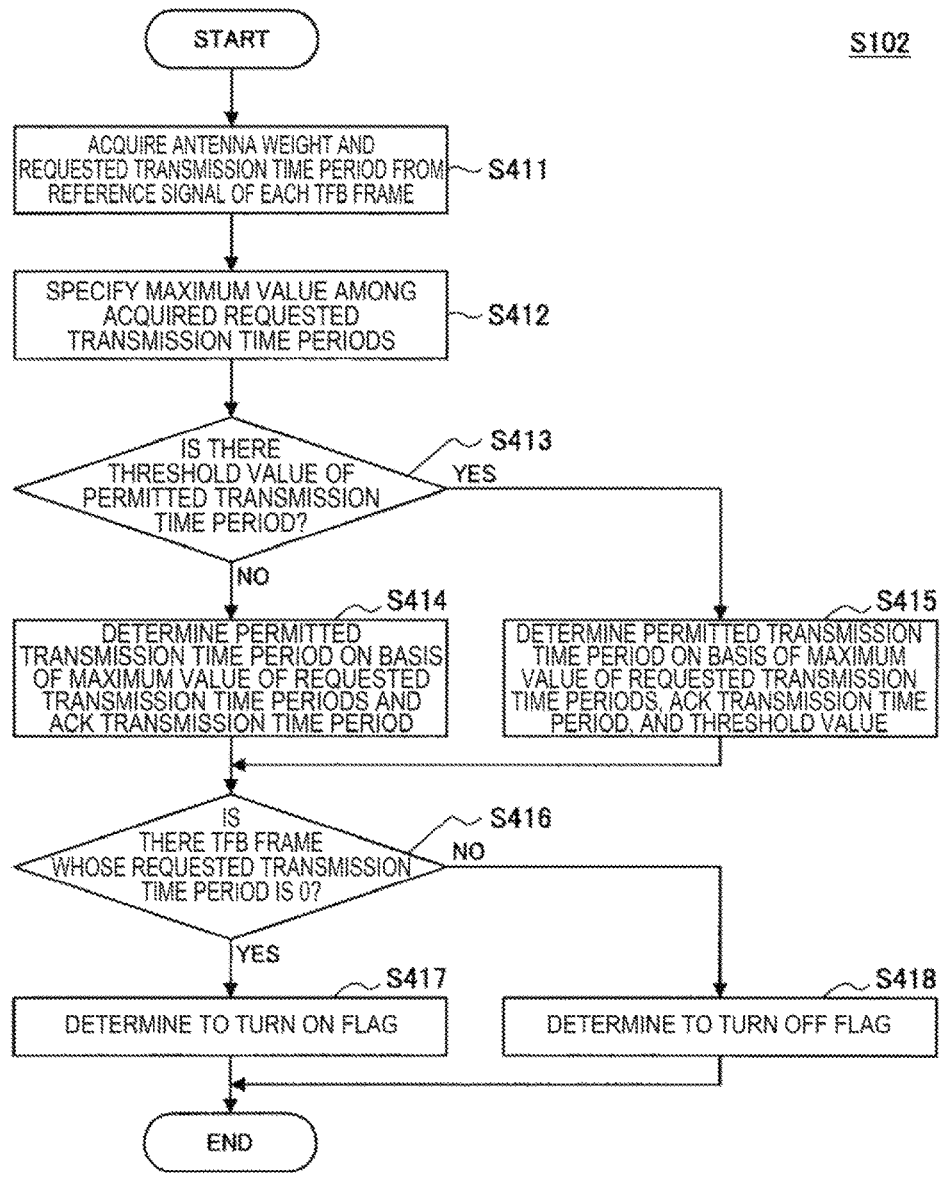
FIG. 11 is a flowchart conceptually showing processing of a master station performing an uplink multiplex transmission time period determination process according to the present embodiment.
Figure 12:
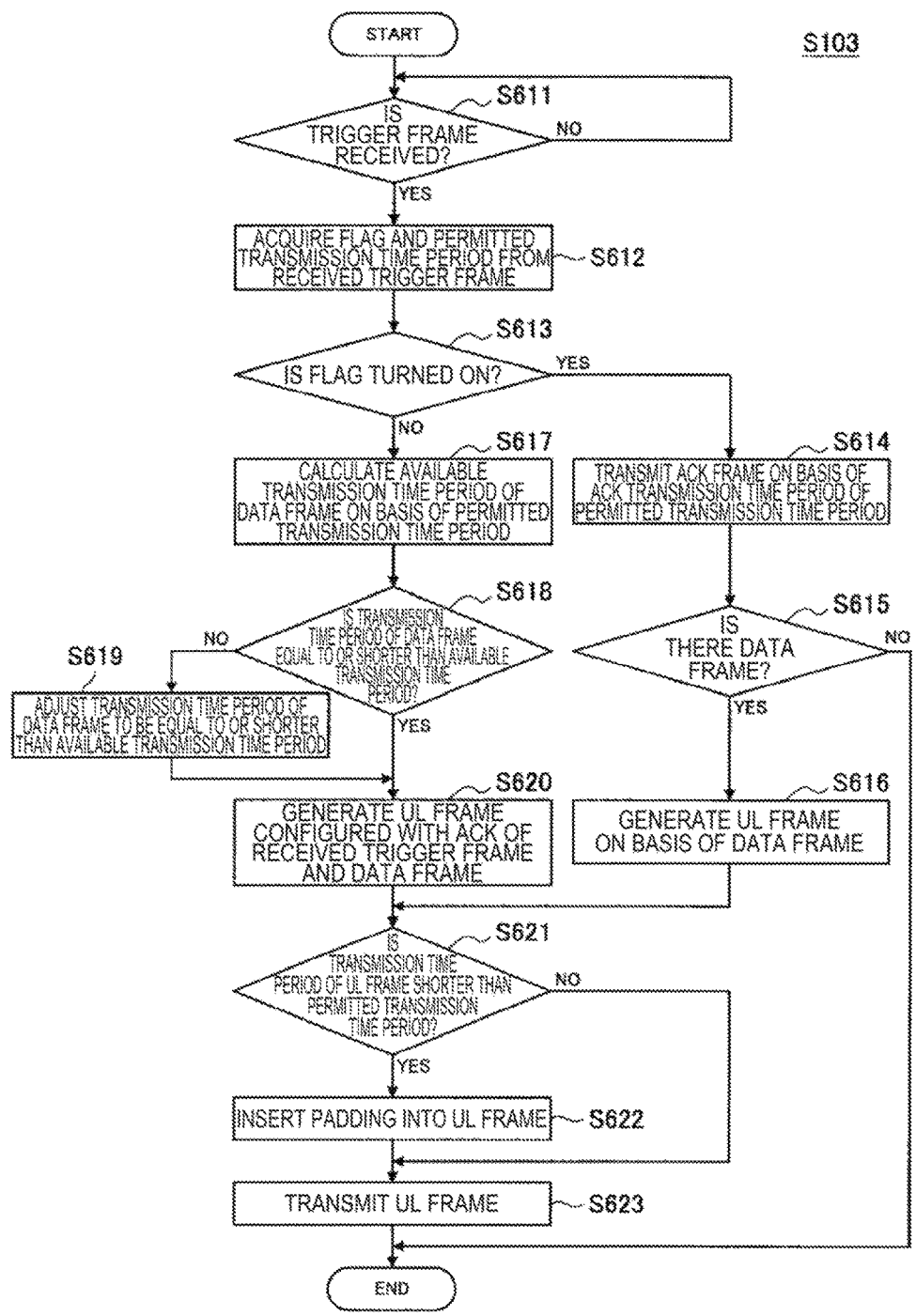
FIG. 12 is a flowchart conceptually showing processing of a slave station in an uplink multiplex transmission and reception process according to the present embodiment.

Next, processing of the communication stations 10-1 according to the present embodiment will be described with reference to FIGS. 10 to 12. Here, only processes different from those of the first embodiment will be described.

(Flow of Uplink Transmission Time Period Notification Process)

First, processing of a master station in an uplink transmission time period notification process will be described with reference to FIG. 10. FIG. 10 is a flowchart conceptually showing processing of a master station in an uplink transmission time period notification process according to the present embodiment.

First, a master station generates a TRQ frame (step S211). Specifically, the data processing unit 11 generates a TRQ frame including information indicating a single slave station which is a destination of the TRQ frame. Here, unlike the first embodiment, information indicating a method of encoding a reference signal is not included in the TRQ frame.

Next, the master station transmits the TRQ frame (step S212), and determines whether a TFB frame has been received within a predetermined time (step S213).

When it is determined that no TFB frame has been received within the predetermined time, the master station determines whether the number of retransmissions of the TRQ frame is equal to or smaller than a predetermined number of times (step S214), and retransmits the TRQ frame when the corresponding number of retransmissions is equal to or smaller than the predetermined number of times.

When it is determined that TFB frames have been received within the predetermined time, the master station determines whether the TFB frames have been received from all of transmission-target stations of trigger frames (step S215). Specifically, the control unit 17 determines whether TFB frames have been received from all transmission-target stations of trigger frames on the basis of past reception results of TFB frames. When it is determined that the TFB frames have not been received from all of the transmission-target stations of trigger frames, the control unit 17 returns to step S211 or step S212 and transmits a TRQ frame to a slave station from which no TFB frame has been received.

(Flow of Uplink Multiplex Transmission Time Period Determination Process)

An uplink multiplex transmission time period determination process will be described next with reference to FIG. 11. FIG. 11 is a flowchart conceptually showing processing of a master station performing an uplink multiplex transmission time period determination process according to the present embodiment.

First, the master station acquires an antenna weight and a requested transmission time period from each TFB frame (step S411), and specifies a maximum value among the acquired requested transmission time periods (step S412).

Next, the master station determines whether there is a threshold value of a permitted transmission time period (step S413), and determines a permitted transmission time period on the basis of the maximum value of requested transmission time periods and an ACK transmission time period (step S414) when it is determined that there is no threshold value of a permitted transmission time period. Specifically, the control unit 17 determines whether there is a threshold value of a permitted transmission time period, and determines $RDG_0$ information indicating a permitted transmission time period of ACK frames and $RDG_1$ information indicating a transmission time period of data frames.

Also, when it is determined that there is a threshold value of a permitted transmission time period, the master station determines a permitted transmission time period on the basis of the maximum value of requested transmission time periods, the ACK transmission time period, and the threshold value (step S415).

Next, the master station determines whether there is a TFB frame whose requested transmission time period is 0 (step S416). Specifically, the control unit 17 determines whether there is a TFB frame in which RDR information indicates a requested transmission time period of 0 or a value corresponding to 0.

When it is determined that there is a TFB frame whose requested transmission time period is 0, the master station determines to turn on a flag (step S417), and in the opposite case, the master station determines to turn off the flag (step S418). Specifically, when it is determined by the control unit 17 that there is a TFB frame whose requested transmission time period is 0 or a value corresponding to 0, the data processing unit 11 inserts a flag whose value is on, in other words, Split_Ack_Flag=1, into a trigger frame. In the opposite case, the data processing unit 11 inserts a flag whose value is off, in other words, Split_Ack_Flag=0, into the trigger frame.

(Flow of Uplink Multiplex Transmission and Reception Process)

An uplink multiplex transmission and reception process will be described next with reference to FIG. 12. FIG. 12 is a flowchart conceptually showing processing of a slave station performing an uplink multiplex transmission and reception process according to the present embodiment.

First, the master station waits until a trigger frame is received (step S611). When a trigger frame is received, the master station acquires a flag and a permitted transmission time period from the corresponding trigger frame (step S612). Specifically, the data processing unit 11 acquires a flag Split_Ack_Flag and RDG information indicating a permitted transmission time period from the trigger frame.

Next, the master station determines whether the flag is turned on (step S613), and transmits an ACK frame on the basis of an ACK transmission time period of the permitted transmission time period (step S614) when it is determined that the flag is turned on. Specifically, the data processing unit 11 determines whether the acquired flag is turned on, in other words, Split_Ack_Flag=1. When it is determined that the flag is turned on, the data processing unit 11 generates only an ACK frame, and the control unit 17 causes the communication unit 12 to transmit the ACK frame in the permitted transmission time period $T_{ack}$ of an ACK frame. Also, since processing (steps S617 to S620) of a case in which it is determined that the flag is turned off is substantially the same as the process of the first embodiment, the description thereof will be omitted.

Next, the master station determines whether there is a data frame (step S615). When there is a data frame, the master station generates a UL frame on the basis of the data frame (step S616). Specifically, the data processing unit 11 determines whether there is data to be transmitted with reference to a transmission buffer or the like, and generates a data frame when there is data. Thereafter, when there is a data frame, the control unit 17 causes the communication unit 12 to transmit the corresponding data frame after lapse of a permitted transmission time period of a UL frame, for example, the period $R_{max}+T_{IFS}+T_{ack}$.

Next, the master station determines whether a transmission time period of the UL frame is shorter than the permitted transmission time period (step S621), and inserts a padding into the UL frame (step S622) when it is determined that the corresponding transmission time period is shorter than the permitted transmission time period.

Next, the master station transmits the UL frame (step S623). Specifically, when the flag is turned on, the control unit 17 causes the communication unit 12 to transmit the UL frame a predetermined time after transmission of the ACK frame. Also, when the flag is turned off, the control unit 17 causes the communication unit 12 to transmit a UL frame configured with the ACK frame and the data frame a predetermined time after transmission of the trigger frame.

(Frame Exchange Sequence in Present Embodiment)

Figure 13:
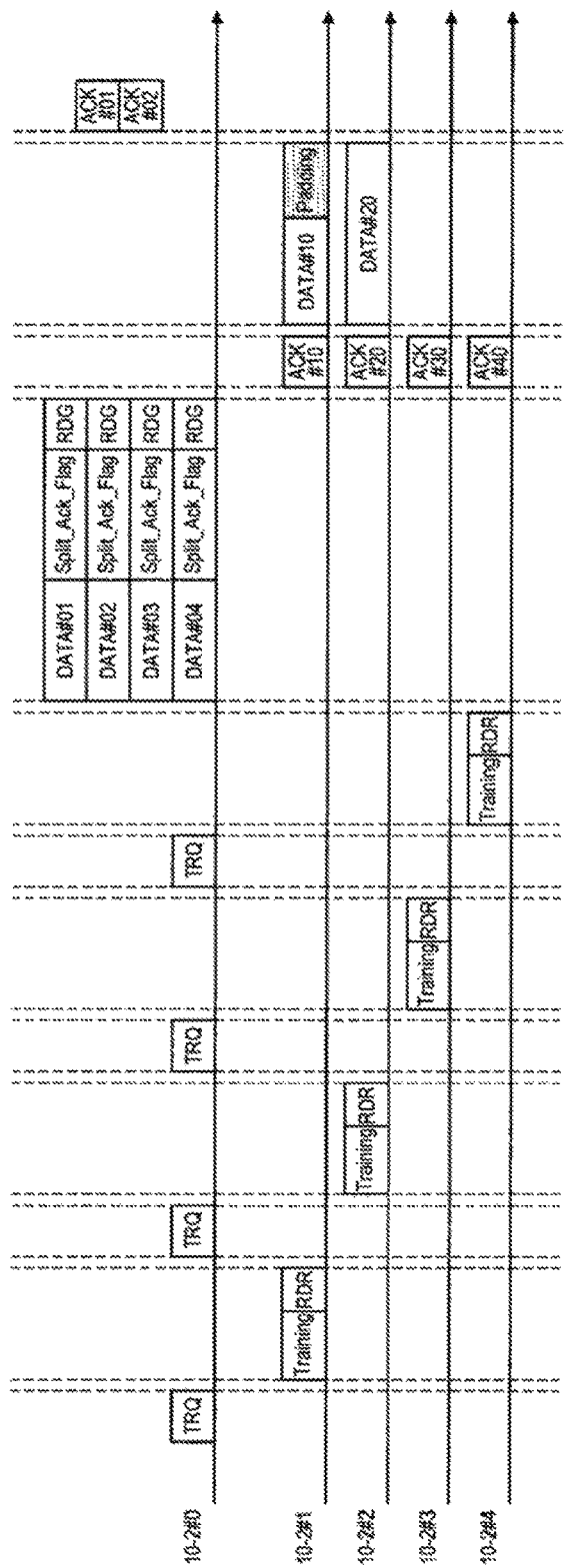
FIG. 13 is a diagram showing an example of a frame exchange sequence performed by a communication system according to the present embodiment.

Processing of the communication system according to the present embodiment has been described above. Next, transmission and reception of frames performed in the communication system will be described with reference to FIG. 13. FIG. 13 is a diagram showing an example of a frame exchange sequence performed by a communication system according to the present embodiment. Here, the description of portions which are substantially the same as those of the first embodiment will be omitted.

First, a master station 10-2#0 transmits a TRQ frame to a slave station 10-2#1. For example, the TRQ frame is transmitted by unicasting or the like, and the slave station 10-2#1 transmits a TFB frame as a response to the TRQ frame. This TRQ/TFB frame exchange is performed with each of other slave stations 10-2#2 to 10-2#4.

Next, the master station 10-2#0 transmits trigger frames to the respective slave stations 10-2#1 to 10-2#4 using space-division multiplexing.

Next, each of the slave stations 10-2#1 to 10-2#4 transmits an ACK frame to the master station 10-2#0 first. Thereafter, when a predetermined time elapses, the slave stations 10-2#1 and 10-2#2 continuously transmit UL frames of only data frames to the master station, and the slave stations 10-2#3 and 10-2#4 do not transmit subsequent UL frames. This is because the slave stations 10-2#3 and 10-2#4 do not have data to be transmitted.

Next, the master station 10-2#0 transmits ACK frames of the received UL frames to the slave stations 10-2#1 and 10-2#2.

As described above, according to the second embodiment of the present disclosure, when any one of frames including first information indicates that a slave station does not transmit a UL frame as a response to a trigger frame, a master station includes information instructing transmission of an acknowledgement of the trigger frame in an independent transmission time period in a first frame.

Here, when permitted transmission time periods are uniformly determined for all slave stations which are targets of communication, a slave station having no data to be transmitted inserts a padding at a position at which a data frame is inserted, and a useless transmission time period lengthens, in other words, power is wasted. On the other hand, according to the present embodiment, a slave station having no data to be transmitted may transmit only an ACK frame, and a transmission time period is optimized, so that power consumption at the slave station can be reduced.

Also, information indicating a common transmission time period is included in information indicating a permitted transmission time period. For this reason, even when a transmission time period of an ACK frame that can be allocated to a slave station varies, the slave station can cope with the corresponding variation, and it is possible to increase flexibility with respect to a change of a communication situation.

<3-3. Variations>

The second embodiment of the present disclosure has been described above. Note that this embodiment is not limited to the above examples. Variations of this embodiment will now be described.

In a variation of the present embodiment, even when a slave station indicates that no UL frame is transmitted as a response to a trigger frame, the slave station may transmit a UL frame. Specifically, if a slave station needs to transmit a UL frame after indicating that no UL frame is transmitted as a response to a trigger frame, when a frame including information indicating a permitted transmission time period is received, the slave station transmits the UL frame in the corresponding permitted transmission time period.

For example, in the slave station, the data processing unit 11 generates a TFB frame including information indicating that a requested transmission time period is 0 or a value corresponding to 0, and the corresponding TFB frame is transmitted to a master station by the communication unit 12.

The master station that has received the corresponding TFB frame determines a permitted transmission time period on the basis of requested transmission time periods of other slave stations, and transmits a trigger frame including information indicating the determined permitted transmission time period to the slave station.

When the corresponding trigger frame is received by the slave station and data to be transmitted is generated after transmission of the TFB frame, the data processing unit 11 generates a UL frame on the basis of information indicating the permitted transmission time period included in the corresponding trigger frame. Thereafter, the control unit 17 transmits the UL frame in the corresponding permitted transmission time period.

As described above, according to the variation of the present embodiment, if a slave station needs to transmit a UL frame after indicating that no UL frame is transmitted as a response to a trigger frame, when a frame including information indicating a permitted transmission time period is received, the slave station transmits the UL frame in the corresponding permitted transmission time period. For this reason, even when a generation time point of data to be transmitted and a transmission time point of a TFB frame are out of sequence, the slave station is enabled to transmit data while the slave station is set as a target of transmission. Therefore, it is possible to reduce waiting time for allocation of wireless communication resources and improve communication efficiency.

<4. Third Embodiment (Example of Multicast Communication)>

Communication apparatuses 10-2 according to the second embodiment of the present disclosure have been described above. Next, communication apparatuses 10-3 according to a third embodiment of the present disclosure will be described. A master station among communication apparatuses 10-3 according to the present embodiment transmits a trigger frame using a multicast scheme.

<4-1. Configuration of Communication Apparatus>

A functional configuration of a communication apparatus 10-3 is substantially the same as the functional configuration according to the first or second embodiment, but the data processing unit 11 and the control unit 17 have partially different functions in a master station. Here, the description of functions which are substantially the same as functions of the first or second embodiment will be omitted.

((Functions Relating to Uplink Multiplex Transmission and Reception Process))

The data processing unit 11 generates one frame including information indicating a permitted transmission time period. Specifically, the data processing unit 11 does not generate a trigger frame including RDG information for each slave station which is a target of transmission, but generates one trigger frame.

The control unit 17 causes the communication unit 12 to transmit the trigger frame using a multicast scheme.

<4-2. Processing of Communication Apparatus>

Processing of the communication apparatuses 10-3 in the communication system according to the present embodiment is substantially the same as processing in the first or second embodiment except that a method of transmitting a trigger frame in the uplink multiplex transmission and reception process is changed from space-division multiplexing to multicasting. For this reason, processing of the present embodiment will be schematically described using a frame exchange sequence.

(Frame Exchange Sequence in Present Embodiment)

Figure 14:
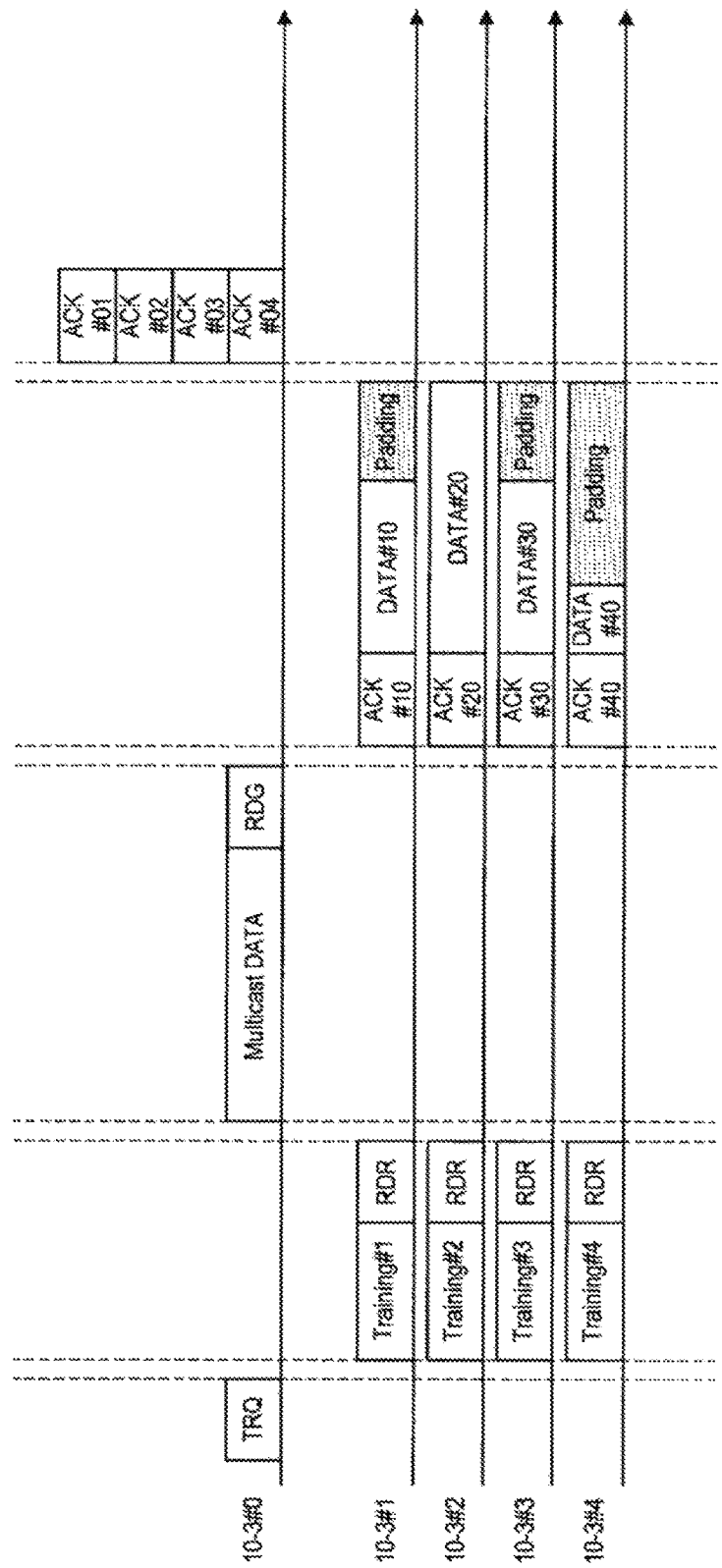
FIG. 14 is a diagram showing an example of a frame exchange sequence performed by a communication system according to a third embodiment of the present disclosure.

Transmission and reception of frames performed in the communication system according to the present embodiment will be described with reference to FIG. 14. FIG. 14 is a diagram showing an example of a frame exchange sequence performed by a communication system according to the present embodiment. Here, the description of portions which are substantially the same as those of the first or second embodiment will be omitted.

First, a master station 10-3#0 transmits a TRQ frame to each of slave stations 10-3#1 to 10-3#4, and each of the slave stations 10-3#1 to 10-3#4 transmits a TFB frame as a response to the TRQ frame.

Next, the master station 10-3#0 transmits a trigger frame to each of the slave stations 10-3#1 to 10-3#4 using a multicast scheme. For example, one trigger frame is generated, and the slave stations 10-3#1 to 10-3#4 are designated as destinations.

Next, each of the slave stations 10-3#1 to 10-3#4 transmits a UL frame to the master station 10-3#0, and the master station 10-3#0 transmits ACK frames of the received UL frames to the slave stations 10-3#1 to 10-3#4.

As described above, according to the third embodiment of the present disclosure, a master station transmits a trigger frame to a plurality of slave stations using a multicast scheme. For this reason, in comparison with a case of space-division multiplexing trigger frames, a space-division multiplexing process is omitted, and thus it is possible to simplify a process involved in transmission of trigger frames.

<5. Fourth Embodiment (Example of Frequency-division Multiplex Communication)>

The communication apparatus 10-3 according to the third embodiment of the present disclosure has been described above. Next, a communication apparatus 10-4 according to a fourth embodiment of the present disclosure will be described. The communication apparatus 10-4 according to this embodiment perform communication using a frequency-division multiplexing scheme instead of a space-division multiplexing scheme.

<5-1. Configuration of Communication Apparatus>

The communication apparatus 10-4 has substantially the same functional configuration as that of the first to third embodiments, however, in the master station, it has partially different functions of the data processing unit 11, the communication unit 12, and the control unit 17. Note that substantially the same functions as those of the first to third embodiments will not be described.

((Basic Functions))

The modulation/demodulation unit 13 and the signal processing unit 14 in the communication unit 12 perform a process involved in frequency-division multiplexing. Specifically, the modulation/demodulation unit 13 divides a frame provided from the data processing unit 11 into portions, the number of which is equal to the number of subcarriers, and modulates each portion of the frame obtained by the division. Thereafter, the modulation/demodulation unit 13 combines signals obtained by the modulation, and provides the signal obtained by the combination to the signal processing unit 14. The signal processing unit 14 performs a process, such as addition of a guard interval, or the like, on the signal provided from the modulation/demodulation unit 13, and provides a signal obtained by the process, i.e., a symbol stream, to the radio interface unit 16.

The signal processing unit 14 performs a process, such as removal of a guard interval, or the like, on the symbol stream related to received waves provided from the radio interface unit 16, and provides a signal obtained by the process to the modulation/demodulation unit 13. The modulation/demodulation unit 13 extracts a subcarrier signal from the signal provided from the signal processing unit 14, and demodulates each subcarrier. Thereafter, the modulation/demodulation unit 13 combines frames obtained by the demodulation, and provides the combined frame to the data processing unit 11.

Here, functions of the data processing unit 11 and the control unit will be described together with processing of the communication apparatuses 10-4.

<5-2. Processing of Communication Apparatus>

Next, processing of the communication system and the communication stations 10-4 in the present embodiment will be described with reference to FIGS. 6 to 8. Here, since processes shown in FIGS. 4 and 5 are substantially the same as those of the first embodiment, the description thereof will be omitted.

(Flow of Uplink Multiplex Transmission Time Period Determination Process)

An uplink multiplex transmission time period determination process in the present embodiment will be described in detail with reference to FIG. 6.

First, the master station acquires a frequency and a requested transmission time period from each TFB frame (step S401). Specifically, the data processing unit 11 acquires information indicating subcarriers allocated to slave stations and requested transmission time periods from TFB frames.

Next, the master station specifies a maximum value among the acquired requested transmission time periods (step S402), and determines whether there is a threshold value of a permitted transmission time period (step S403).

When it is determined that there is no threshold value of a permitted transmission time period, the master station determines a permitted transmission time period on the basis of the maximum value of requested transmission time periods and an ACK transmission time period (step S404). Specifically, the control unit 17 determines the sum of the maximum value $R_{max}$ of requested transmission time periods and the ACK transmission time period $T_{ack}$ as a permitted transmission time period.

Here, the control unit 17 determines the permitted transmission time period to be a value corresponding to frequency-division multiplexing. Specifically, the control unit 17 applies effects of degradation of a data rate caused by frequency-division multiplexing to a permitted transmission time period. For example, when the requested transmission time periods are values obtained without assuming that frames to be transmitted are frequency-division multiplexed, the control unit 17 multiplies the requested transmission time periods by a value corresponding to a frequency division number. For example, when a frequency band is quartered and allocated to respective slave stations, a data rate of each slave station is quartered, and thus a value obtained by multiplying a requested transmission time period by four is used to determine a permitted transmission time period.

When it is determined that there is a threshold value of a permitted transmission time period, the master station determines a permitted transmission time period on the basis of the maximum value of requested transmission time periods, the ACK transmission time period, and the threshold value (step S405).

(Flow of Uplink Multiplex Transmission and Reception Process)

An uplink multiplex transmission and reception process in the present embodiment will be described in detail next. First, processing of the master station in the uplink multiplex transmission and reception process will be described with reference to FIG. 7.

First, the master station generates trigger frames including information indicating the permitted transmission time period (step S501), and transmits the trigger frames which are frequency-division multiplexed (step S502). Specifically, the communication unit 12 modulates and multiplexes respective trigger frames generated by the data processing unit 11 using different subcarriers and transmits the multiplexed trigger frames. Here, the data processing unit 11 includes subcarrier information indicating the subcarriers allocated to the respective slave stations in the trigger frames. For example, the subcarrier information may be inserted into a PHY header portion. It is assumed that a PHY header is modulated using an entire frequency band. Also, the slave stations may be previously notified of the subcarrier information, or the subcarrier information may be fixed for each slave station. Here, an example in which subcarrier information relating to multiplexing (downlink multiplexing) of the corresponding trigger frames and subcarrier information relating to multiplexing (uplink multiplexing) of UL frames transmitted as responses to the corresponding trigger frames are the same has been described, but these pieces of subcarrier information may be different. In this case, the slave stations are separately notified of respective pieces of the subcarrier information relating to downlink multiplexing and uplink multiplexing.

Next, the master station determines whether UL frames have been received within a predetermined time (step S503). Specifically, the communication unit 12 waits the predetermined time to receive UL frames. At this time, the communication unit 12 performs a process of separating UL frames using the subcarriers indicated by the subcarrier information included in the trigger frames. Also, even before the transmission of the trigger frames, the communication unit 12 may retain the subcarrier information of which the slave stations have been notified, and perform the process of separating the UL frames using the corresponding subcarrier information. Here, when the subcarrier information relating to downlink multiplexing and the subcarrier information transmitted as responses to the trigger frames and relating to uplink multiplexing are different, the corresponding separation process is performed on the basis of the subcarrier information relating to uplink multiplexing.

When it is determined that UL frames have been received within the predetermined time, the master station transmits ACK frames of the received UL frames (step S505). Specifically, the communication unit 12 performs a process for frequency-division multiplexing generated ACK frames using the retained subcarrier information and transmits the processed ACK frames to the slave stations.

When it is determined that UL frames have not been received within the predetermined time, the master station determines whether the number of retransmissions of the trigger frames is equal to or smaller than a predetermined number of times (step S505).

Processing of a slave station in the uplink multiplex transmission and reception process according to the present embodiment will be described next with reference to FIG. 8.

First, a slave station waits until a trigger frame is received (step S601). When a trigger frame is received, the slave station acquires the permitted transmission time period from the corresponding trigger frame (step S602). Specifically, the communication unit 12 acquires the subcarrier information from the received trigger frame. For example, the communication unit 12 acquires subcarrier information indicating a subcarrier addressed to the slave station from a PHY header of the trigger frame. Thereafter, the communication unit 12 performs a frame demodulation process and the like on the subcarrier indicated by the corresponding subcarrier information. Also, the corresponding subcarrier information is retained to be used in a post-stage process. Here, when the subcarrier information relating to downlink multiplexing and the subcarrier information relating to uplink multiplexing are different, the subcarrier information relating to downlink multiplexing is used in the corresponding demodulation process and the like, and the subcarrier information relating to uplink multiplexing is retained to be used in a post-stage process.

Next, the slave station performs the process of steps S603 to S609. Here, a transmission time period in the corresponding process is handled as a value in which frequency-division multiplexing has been taken into consideration.

Also, a frame exchange sequence in the present embodiment is substantially the same as that of the first embodiment, and thus the description thereof will be omitted.

As described above, according to the fourth embodiment of the present disclosure, a master station frequency-division multiplexes first frames and transmits the multiplexed first frames to a plurality of slave stations. For this reason, even an apparatus and the like conforming to a wireless communication standard which does not support a space-division multiplexing scheme is included among application targets, and thus it is possible to further improve communication efficiency.

<6. Application Example>

The technology according to the embodiments of the disclosure can be applied to various products. For example, the communication apparatus 10 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the communication apparatus 10 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the communication apparatus 10 may be wireless communication modules mounted in such terminals (for example, integrated circuit modules configured by one die).

On the other hand, for example, the master station of the communication apparatus 10 may be realized as a wireless LAN access point (also referred to as a wireless base station) which has a router function or does not have a router function. The master station of the communication apparatus 10 may be realized as a mobile wireless LAN router. The master station of the communication apparatus 10 may also be a wireless communication module (for example, an integrated circuit module configured with one die) mounted on the device.

<6-1. First Application Example>

Figure 15:
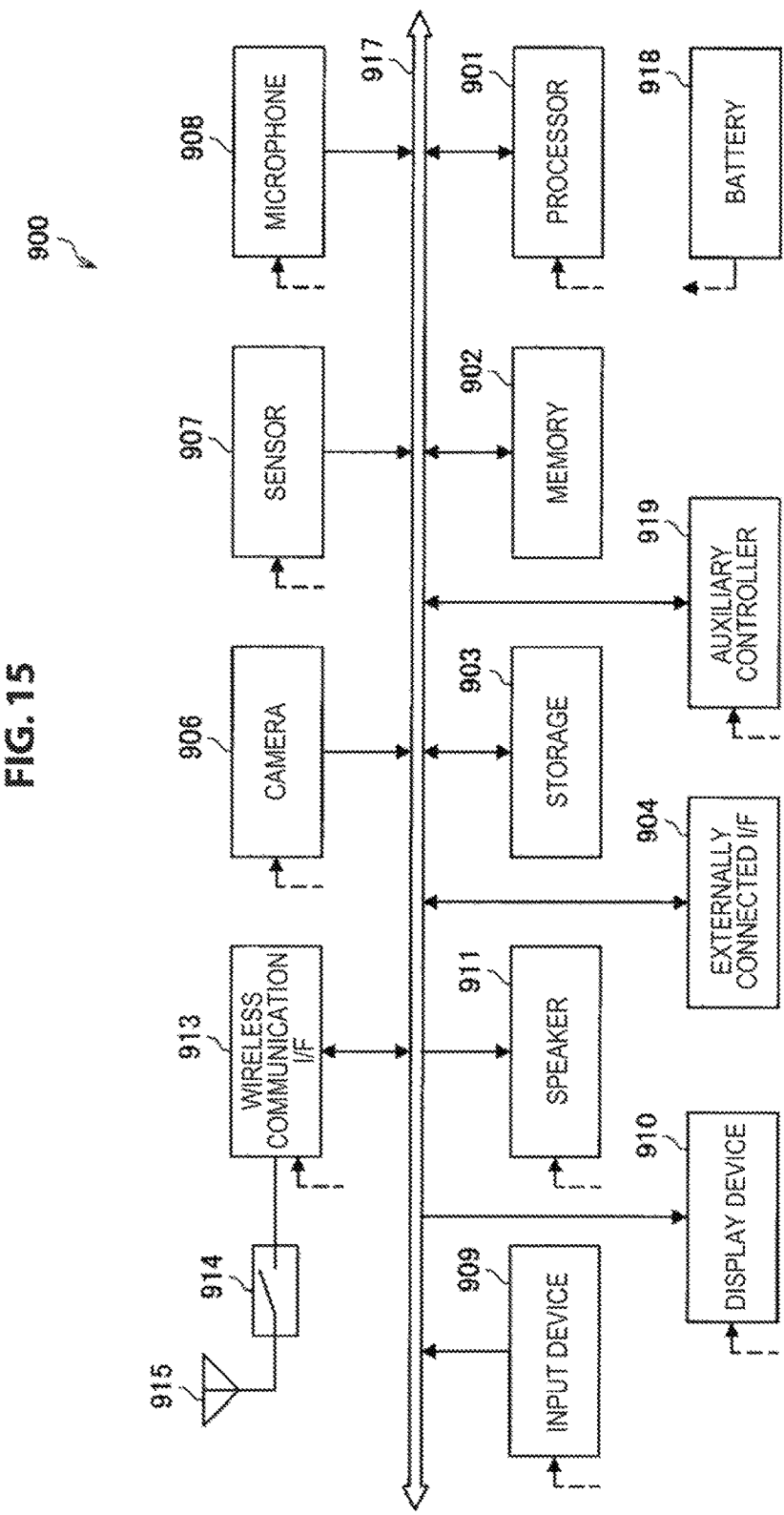
FIG. 15 is a block diagram showing an example schematic configuration of a smartphone.

FIG. 15 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 15. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 15 via power supply lines partially indicated by dashed lines in the drawing. The auxiliary controller 919 causes, for example, necessary minimum functions of the smartphone 900 to be operated in a sleep mode.

In the smartphone 900 shown in FIG. 15, the data processing unit 11, the communication unit 12, and the control unit 17 described with reference to FIG. 2 may be mounted in the wireless communication interface 913. At least some of the functions may be mounted on the processor 901 or the auxiliary controller 919. For example, the control unit 17 determines a permitted transmission time period on the basis of received requested transmission time periods, so that communication efficiency can be improved.

Note that the smartphone 900 may operate as a wireless access point (software AP) as the processor 901 executes the function of an access point at an application level. In addition, the wireless communication interface 913 may have the function of a wireless access point.

<6-2. Second Application Example>

Figure 16:
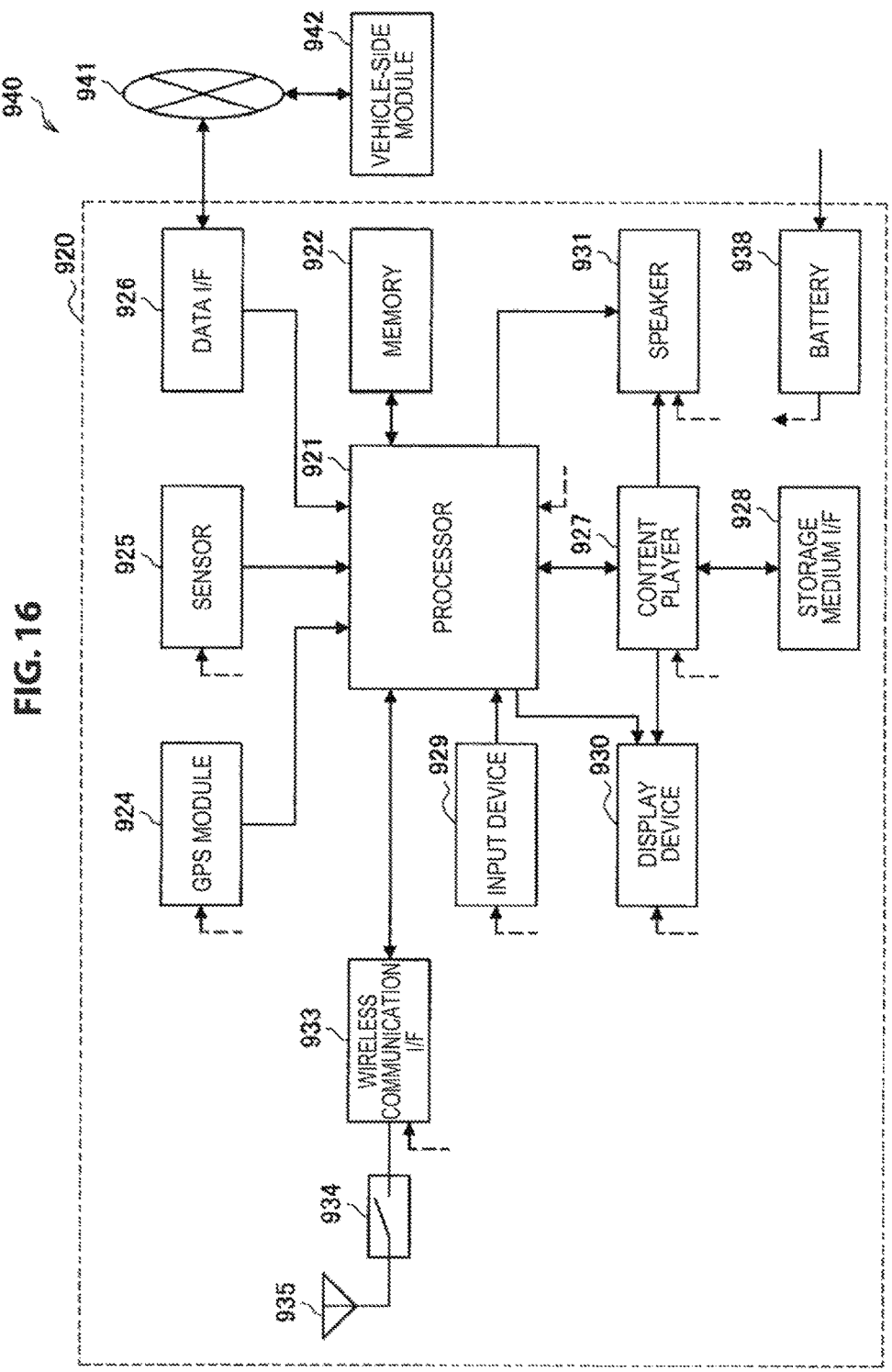
FIG. 16 is a block diagram showing an example schematic configuration of a car navigation device.

FIG. 16 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 16. In this case, the antenna switch 934 may be omitted from the configuration of the car navigation device 920.

The battery 938 supplies electric power to each of the blocks of the car navigation device 920 shown in FIG. 16 via power supply lines partially indicated by dashed lines in the drawing. In addition, the battery 938 accumulates electric power supplied from the vehicle.

In the car navigation device 920 shown in FIG. 16, the data processing unit 11, the communication unit 12, and the control unit 17 described with reference to FIG. 2 may be mounted in the wireless communication interface 933. At least some of the functions may be mounted on the processor 921. For example, the control unit 17 determines a permitted transmission time period on the basis of received requested transmission time periods, so that communication efficiency can be improved.

In addition, the wireless communication interface 933 may operate as the communication apparatus 10 described above and provide wireless connection to a terminal owned by a user who is riding in a vehicle. At this time, for example, it is possible to increase communication speed between the terminal owned by the user and the car navigation device 920.

The technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

<6-3. Third Application Example>

Figure 17:
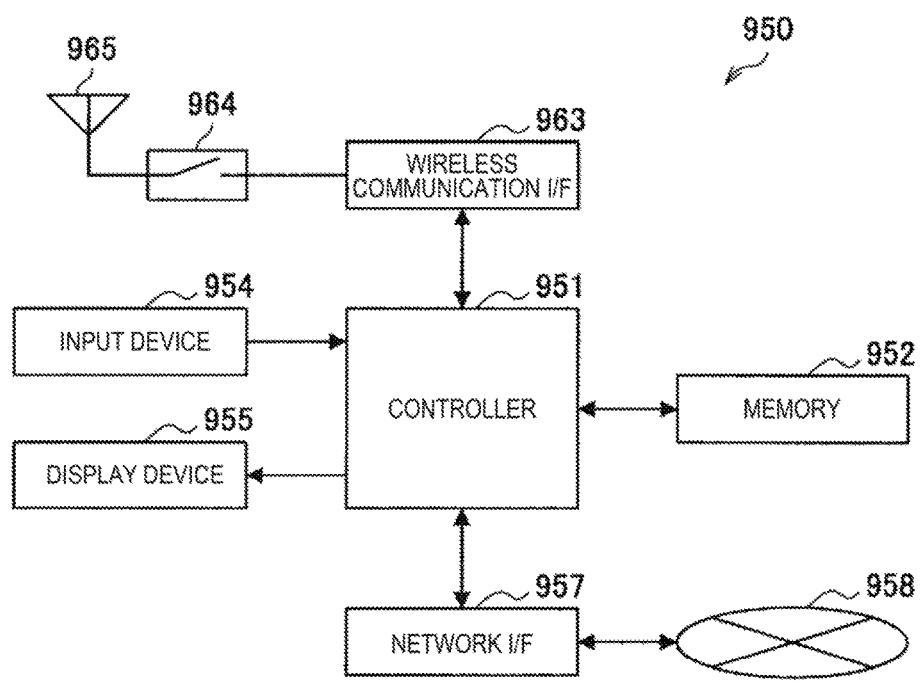
FIG. 17 is a block diagram showing an example schematic configuration of a wireless access point.

FIG. 17 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 shown in FIG. 14, the data processing unit 11, the communication unit 12, and the control unit 17 described with reference to FIG. 2 may be mounted on the wireless communication interface 963. At least some of the functions may be mounted on the controller 951. For example, the control unit 17 determines a permitted transmission time period on the basis of received requested transmission time periods, so that communication efficiency can be improved.

<7. Conclusion>

As described above, according to the first embodiment of the present disclosure, a frame is transmitted from a slave station in a permitted transmission time period suitable for a situation of the slave station, and thus it is possible to reconcile efficient use of wireless communication resources with stabilization of reception performance in wireless multiplex communication. Also, since a master station side determines the permitted transmission time period and notifies the slave station of the permitted transmission time period, a process of determining a transmission time period is not performed on the slave station side, and it is possible to achieve simplification of a process and power saving at the slave station. In addition, according to the second embodiment of the present disclosure, a slave station having no data to be transmitted need only transmit an ACK frame, and a transmission time period is optimized, so that power consumption at the slave station can be reduced. In addition, according to the third embodiment of the present disclosure, in comparison with a case of space-division multiplexing trigger frames, a space-division multiplexing process is omitted, and thus it is possible to simplify a process involved in transmission of trigger frames. In addition, according to the fourth embodiment of the present disclosure, even an apparatus and the like conforming to a wireless communication standard which does not support a space-division multiplexing scheme is included among application targets, and thus it is possible to further improve communication efficiency.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, any one of communication stations 10 is a master station or a slave station, but the present technology is not limited to such examples. For example, an AP apparatus may operate as a master station, and a terminal apparatus may operate as a slave station.

Also, a TRQ/TFB frame exchange process in the above embodiments may be performed as a part of request to send (RTS)/clear to send (CTS) frame exchange.

Further, in the above embodiments, examples in which information such as requested transmission time periods (RDR), a permitted transmission time period (RDG), a flag (Split_Ack_Flag), and the like is stored in a MAC header or the like have been described, but the corresponding information may be stored at the end or an arbitrary position in a frame as shown in FIGS. 9, 13, 14, and the like.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication apparatus including:

a communication unit configured to receive frames including first information from a plurality of other communication apparatuses and transmit first frames including information indicating a first transmission time period to the plurality of other communication apparatuses;

a control unit configured to determine the first transmission time period on the basis of the plurality of pieces of first information; and a processing unit configured to generate the first frames.

(2)

The communication apparatus according to (1), wherein the first information includes information indicating transmission time periods desired to be used in transmission of user data by the plurality of other communication apparatuses.

(3)

The communication apparatus according to (2), wherein the control unit determines the first transmission time period on the basis of a transmission time period longer than other transmission time periods among the transmission time periods indicated by respective pieces of the first information.

(4)

The communication apparatus according to (2) or (3), wherein, when the first transmission time period determined on the basis of a transmission time period longer than other transmission time periods among the transmission time periods indicated by respective pieces of the first information is greater than a threshold value, the control unit determines the first transmission time period to be a transmission time period equal to or less than the threshold value.

(5)

The communication apparatus according to (4), wherein the threshold value is determined on the basis of information indicating a spare time of a wireless channel or information indicating an amount of traffic relating to communication of the communication apparatus.

(6)

The communication apparatus according to (4), wherein the communication unit refrains from transmitting the first frame to another communication apparatus which is a transmission source of a frame including first information indicating a transmission time period greater than the threshold value.

(7)

The communication apparatus according to any one of (1) to (6), wherein, when any one of the frames including the first information indicates that one of the other communication apparatuses does not desire to transmit user data as a response to the first frame, the processing unit includes information instructing transmission of an acknowledgement of the first frame in an independent transmission time period in the first frame.

(8)

The communication apparatus according to any one of (1) to (7), wherein the processing unit includes information designating transmission power used for frames transmitted from the plurality of other communication apparatuses to the communication apparatus in the first frames.

(9)

The communication apparatus according to (8), wherein the transmission power is designated so that a difference in reception power between the respective frames transmitted from the plurality of other communication apparatuses to the communication apparatus is small at the communication apparatus.

(10)

The communication apparatus according to any one of (1) to (9), wherein the frames including the first information include reference signals, and the communication unit transmits frames indicating a request for transmission of frames including the first information to the plurality of other communication apparatuses.

(11)

The communication apparatus according to (10), wherein the frames including the first information are multiplexed by encoding the reference signals.

(12)

The communication apparatus according to (10) or (11), wherein the processing unit acquires antenna weights on the basis of the reference signals, and the communication unit space-division multiplexes the first frames using the antenna weights and transmits the multiplexed first frames to the plurality of other communication apparatuses.

(13)

The communication apparatus according to any one of (1) to (11), wherein the communication unit frequency-division multiplexes the first frames and transmits the multiplexed first frames to the plurality of other communication apparatuses.

(14)

The communication apparatus according to any one of (1) to (11), wherein the communication unit transmits the first frames to the plurality of other communication apparatuses using a multicasting scheme.

(15)

A communication apparatus including:
a communication unit configured to transmit a frame including first information to a first communication apparatus, and receive a first frame including information indicating a first transmission time period determined by the first communication apparatus on the basis of a plurality of pieces of the first information; and
a processing unit configured to generate a frame on the basis of the information indicating the first transmission time period.

(16)

The communication apparatus according to (15), wherein the processing unit generates the frame so that a transmission time period becomes the first transmission time period.

(17)

The communication apparatus according to (16), wherein the processing unit generates the frame in which a frame that is an acknowledgement of the first frame is connected to user data.

(18)

The communication apparatus according to (16) or (17), wherein, in generating the frame, the processing unit divides the frame when the transmission time period of the frame exceeds the first transmission time period.

(19)

The communication apparatus according to any one of (16) to (18), wherein, in generating the frame, the processing unit adds a padding to the frame when the transmission time period of the frame is shorter than the first transmission time period.

(20)

A communication method including:
receiving frames including first information from a plurality of other communication apparatuses, and transmitting first frames including information indicating a first transmission time period to the plurality of other communication apparatuses;
determining the first transmission time period on the basis of the plurality of pieces of first information; and
generating the first frames.

(21)

A communication system including:
a communication unit configured to receive frames including first information from a plurality of other communication apparatuses and transmit first frames including information indicating a first transmission time period to the plurality of other communication apparatuses;
a control unit configured to determine the first transmission time period on the basis of the plurality of pieces of first information; and
a processing unit configured to generate the first frames.

(22)

A program causing a computer to implement:
a communication function of receiving frames including first information from a plurality of other communication apparatuses, and transmitting first frames including information indicating a first transmission time period to the plurality of other communication apparatuses;
a control function of determining the first transmission time period on the basis of the plurality of pieces of first information; and
a processing function of generating the first frames.

REFERENCE SIGNS LIST

10 communication apparatus
11 data processing unit
12 communication unit
13 modulation/demodulation unit
14 signal processing unit
15 channel estimation unit
16 transceiver unit
17 control unit

The invention claimed is:
1. A first communication apparatus, wherein the first communication apparatus is configured to
wirelessly communicate with a plurality of second communication apparatuses based on IEEE802.11 standard, and
wherein the first communication apparatus comprises:
processing circuitry configured to:
receive a first frame from the plurality of second communication apparatuses,
wherein the first frame includes resource information related to resources for transmissions by the plurality of second communication apparatuses; and
transmit a plurality of trigger frames to the plurality of second communication apparatuses, wherein each trigger frame of the plurality of trigger frames includes:

transmission time period information to indicate a first transmission time period for the plurality of second communication apparatuses to perform an uplink multiplexing operation, and transmission power information to indicate a transmission power for the plurality of second communication apparatuses to perform the uplink multiplexing operation.

2. The first communication apparatus according to claim 1, wherein the processing circuitry is further configured to:
transmit a request frame to the plurality of second communication apparatuses, wherein the request frame is configured to request the plurality of second communication apparatuses to transmit the first frame; and
receive the first frame from the plurality of second communication apparatuses based on the transmitted request frame.

3. The first communication apparatus according to claim 1, wherein the processing circuitry is further configured to determine the first transmission time period based on a second transmission time period longer than other transmission time periods among transmission time periods indicated by respective pieces of the resource information.

4. The first communication apparatus according to claim 1, wherein the processing circuitry is further configured to:
determine the first transmission time period based on a second transmission time period longer than other transmission time periods among transmission time periods indicated by respective pieces of the resource information; and
determine the first transmission time period to be a third transmission time period equal to or less than a threshold value based on the first transmission time period that is greater than the threshold value.

5. The first communication apparatus according to claim 4, wherein the threshold value is determined based on one of information indicating a spare time of a wireless channel or information indicating an amount of traffic relating to communication of the first communication apparatus.

6. The first communication apparatus according to claim 4, wherein the processing circuitry is further configured to:
refrain transmission of the plurality of trigger frames to a second communication apparatus of the plurality of second communication apparatuses,
wherein the second communication apparatus is a transmission source of a second frame including the resource information indicating a fourth transmission time period greater than the threshold value.

7. The first communication apparatus according to claim 1, wherein the processing circuitry is further configured to:
determine whether the first frame including the resource information indicates that transmission of user data as a response to one of the plurality of trigger frames is undesired by one of the plurality of second communication apparatuses; and
insert information instructing transmission of an acknowledgement of the one of the plurality of trigger frames in an independent transmission time period in the plurality of trigger frames.

8. The first communication apparatus according to claim 1, wherein the processing circuitry is further configured to include the transmission power information in each trigger frame of the plurality of trigger frames.

9. The first communication apparatus according to claim 8, wherein the processing circuitry is further configured to designate the transmission power so that a difference in reception power between the first frame received from the plurality of second communication apparatuses is smaller than a determined value at the first communication apparatus.

10. The first communication apparatus according to claim 1, wherein the first frame further includes reference signals, and
wherein the processing circuitry is further configured to transmit, to the plurality of second communication apparatuses, frames indicating a request for transmission of the first frame including the resource information.

11. The first communication apparatus according to claim 10, wherein the first frame including the resource information is multiplexed by encoding the reference signals.

12. The first communication apparatus according to claim 10, wherein the processing circuitry is further configured to:
acquire antenna weights based on the reference signals;
space-division multiplex the plurality of trigger frames based on the acquired antenna weights; and
transmit the space-division multiplexed plurality of trigger frames to the plurality of second communication apparatuses.

13. The first communication apparatus according to claim 1, wherein the processing circuitry is further configured to:
frequency-division multiplex the plurality of trigger frames; and
transmits the frequency-division multiplexed plurality of trigger frames to the plurality of second communication apparatuses.

14. The first communication apparatus according to claim 1, wherein the processing circuitry is further configured to transmit the plurality of trigger frames to the plurality of second communication apparatuses based on a multicasting scheme.

15. A second communication apparatus, wherein the second communication apparatus is configured to
wirelessly communicate with a first communication apparatus based on IEEE802.11 standard, and
wherein the second communication apparatus comprises:
processing circuitry configured to:
transmit a first frame to the first communication apparatus,
wherein the first frame includes resource information related to resources for transmissions by the second communication apparatus; and
receive a trigger frame from the first communication apparatus, wherein the trigger frame includes:
transmission time period information to indicate a first transmission time period for the second communication apparatus to perform an uplink multiplexing operation, and
transmission power information to indicate a transmission power for the second communication apparatus to perform the uplink multiplexing operation.

16. The second communication apparatus according to claim 15, wherein the processing circuitry is further configured to generate the first frame so that a second transmission time period of the first frame becomes the first transmission time period.

17. The second communication apparatus according to claim 16, wherein the processing circuitry is further configured to generate the first frame in which a second frame is connected to user data, wherein the second frame is an acknowledgement of the trigger frame.

18. The second communication apparatus according to claim 16, wherein, in generation of the first frame, the processing circuitry is further configured to:
   determine whether the second transmission time period of the first frame exceeds the first transmission time period; and
   divide the first frame based on the determination.

19. The second communication apparatus according to claim 16, wherein, in generation of the first frame, the processing circuitry is further configured to pad the first frame based on the second transmission time period of the first frame that is shorter than the first transmission time period.

20. A communication method of a first communication apparatus, comprising:
   wirelessly communicating with a plurality of second communication apparatuses based on IEEE802.11 standard;
   receiving a first frame from the plurality of second communication apparatuses,
   wherein the first frame includes resource information related to resources for transmissions by the plurality of second communication apparatuses; and
   transmitting a plurality of trigger frames the plurality of second communication apparatuses, wherein each trigger frame of the plurality of trigger frames includes:
      transmission time period information indicating a transmission time period for the plurality of second communication apparatuses to perform an uplink multiplexing, and
      transmission power information indicating a transmission power for the plurality of second communication apparatuses to perform the uplink multiplexing.

21. The first communication apparatus according to claim 1, wherein the resource information is generated based on an amount of data to be transmitted, and wherein the amount of data to be transmitted is calculated based on a transmission buffer of each second communication apparatus of the plurality of second communication apparatuses.

22. The second communication apparatus according to claim 15, wherein the processing circuitry is further configured to:
   calculate an amount of data to be transmitted based on a transmission buffer of the second communication apparatus; and
   generate the resource information based on the calculated amount of data.

* * * * *